United States Patent [19]

Kawanishi

[11] Patent Number: 5,591,500
[45] Date of Patent: Jan. 7, 1997

[54] INFORMATION RECORDING MEDIUM

[75] Inventor: Yoshitaka Kawanishi, Tokyo, Japan

[73] Assignee: NEC Corporation, Tokyo, Japan

[21] Appl. No.: 516,631

[22] Filed: Aug. 18, 1995

[30] Foreign Application Priority Data

Aug. 26, 1994 [JP] Japan .................................. 6-201807

[51] Int. Cl.$^6$ ...................................................... B52B 5/00
[52] U.S. Cl. .................... 428/641; 428/64.2; 428/64.4;
428/64.5; 428/64.6; 420/413; 430/270.1;
430/270.11; 430/270.12; 430/270.13; 430/495.1;
430/445; 569/283; 569/288
[58] Field of Search ................................ 428/64.1, 64.2,
428/64.4, 64.5, 64.6, 457, 469, 688, 689,
913; 430/270, 495, 945, 270.1, 270.11,
270.12, 270.13; 369/283, 288

[56] References Cited

U.S. PATENT DOCUMENTS

| | | | |
|---|---|---|---|
| 5,171,618 | 12/1992 | Suzuki | 428/64 |
| 5,234,737 | 8/1993 | Ueno et al. | 428/64 |
| 5,304,440 | 4/1994 | Ono et al. | 430/21 |
| 5,334,433 | 8/1994 | Tominaga | 428/64 |
| 5,362,538 | 11/1994 | Ohbayashi et al. | 428/64 |
| 5,418,030 | 5/1995 | Tominaga et al. | 428/64 |

FOREIGN PATENT DOCUMENTS

| | | |
|---|---|---|
| 0578015A1 | 6/1992 | European Pat. Off. . |
| 62-119755 | 6/1987 | Japan . |

OTHER PUBLICATIONS

Yamanaka et al.; "High Density Optical Recording by Super–resolution System"; International Symposium on Optical Memory 1989, 27D–17, pp. 99–100, Sep. 1989, Technical Digest.

Fukuhisa et al.; "Reproducing C/N Characteristic of High Density Magneto–Optic Disk Using Super Resolution Head"; Extended Abstracts of the 39th Meeting of the Japanese Soc. of Appl. Physics . . . ; 31p–L–6, p. 1002, Mar., 1992.

Ichiura et al.; "High Density Video Disc Using Super–resolution and Green Laser", Int'l Symposium on Optical Memory and Optical Data Storage '93, Tul. 4, pp. 10–11, Jul. 1993.

M. Terao et al.; "Oxidation Resistance of Pb–Te–Se Optical Recording Film"; Journal of Applied Physics 62 (3), p. 1029, 1987.

K. Ichihara et al.; "Optical Disk Medium"; Electronic Ceramics, vol. 18 (90), p. 5, Nov. 1987.

M. Mashita et al.; "Amorphous Te–C Films for an Optical Disk"; Proceedings SPIE Optical Disk Technology, vol. 329, pp. 190–194, 1982.

H. Yamazaki et al.; "Plasma Poymerized $CS_2$–Te Film for Laser Beam Memory"; 1984, Review of Electrical Communication Laboratories, vol. 32, No. 2, pp. 260–266.

Primary Examiner—Patrick Ryan
Assistant Examiner—Elizabeth Evans
Attorney, Agent, or Firm—Whitham, Curtis, Whitham & McGinn

[57] ABSTRACT

An information recording medium includes a transparent substrate, an interference layer formed on the transparent substrate, a recording layer formed on the interference layer, a reflective layer formed on the recording layer, and a coating resin formed on the reflective layer. The recording layer has a pit region and a mirror region. The reflectivity of the pit portion changes as a thickness of the recording layer changes. The reflectivity characteristic of the mirror region is selectively adjustable from that of the pit region within a range of thicknesses of the interference layer.

22 Claims, 15 Drawing Sheets

INFORMATION RECORDING MEDIUM

BACKGROUND OF THE INVENTION

The present invention relates to an information recording medium, and more particularly to an optical information recording medium.

A super-resolution optical system is used to increase the recording density of an optical information recording medium. The general structure of the super-resolution optical system is disclosed in the following references:

Yamanaka et al., "High Density Optical Recording by Super-resolution system", International Symposium on Optical Memory 1989, 27D—17, pp. 99–100, Sept. 1989, Technical Digest;

Fukuhisa et al., "Reproducing C/N Characteristic of High Density Magneto-Optic Disk Using Super Resolution Head", Extended Abstracts of the 39th Meeting of the Japanese Society of Applied Physics and Related Societies, 31p-L-6, p. 1002, March, 1992; and Ichiura et al., "High Density Video Disc Using Super-resolution and Green Laser", International Symposium on Optical Memory and Optical Data Storage '93, Tul. 4, pp. 10–11, July 1993.

In a super-resolution optical system, diffraction means (e.g., a shield plate or a double rhomb prism) is placed between a light source and a medium. The diffraction means forms a diffraction pattern of the light on the medium. The diameter of the center spot (main lobe) of the diffraction pattern is approximately 20% smaller than that of the smallest spot formed without the diffraction means. The reduction of the spot diameter increases the recording density of the medium by about 1.5 times.

The super-resolution optical system is used with a conventional optical information recording medium based on the phase-contrast technique. Examples of the conventional optical recording medium are disclosed in the following references.

A conventional medium including a Pb-Te-Se film is disclosed in M. Terao, et al. "Oxidation Resistance of Pb-Te-Se Optical Recording Film", Journal of Applied Physics 62 (3), p.1029, 1987.

A conventional medium including a Te-C film is disclosed in Katsutaro Ichihara, Hideki Okawa, "Optical Disk Medium", Electronic Ceramics Vol. 18 (90), p.5, November 1987, and M. Mashira, N. Yasuda, "Amorphous Te-C Films for an Optical Disk", Proceedings SPIE Optical Disk Technology Vol. 329, pp.190–194, 1982.

A conventional medium including $CS_2$-Te film is disclosed in H. Yamazaki, et al., "Plasma Polymerized $CS_2$-Te Film for Laser Beam Memory", Review of Electrical Communication Laboratories Vol. 32 No. 2, pp.260–266, 1984.

A conventional medium including an organic recording film is disclosed in a Japanese Unexamined Patent Publication sho-62-119755.

The conventional phase-contrast medium has a mirror surface and a bump protruding from the mirror surface (hereinafter referred to as a mirror region and a pit region). Typically, the height of the bump is one-quarter the wavelength of the light.

In the conventional phase-contrast medium, contrast, which represents "bits" of information, is produced by the destructive interference of light waves. Therefore, the mirror region and the pit region have nearly the same reflectivity. When the light spot is on a planar part of the mirror region, the light is simply reflected from the mirror region. When the light spot is on the pit region, the light is reflected from the pit region as well as from the mirror region. The light wave reflected from the pit region and the light wave reflected from the mirror region are in phase opposition. Thus, the destructive interference of the two light waves occurs to suppress light reflection in the pit region.

However, the combination of the super-resolution optical system and the conventional media causes the following problem.

In the super-resolution optical system, the diffraction pattern formed on the medium includes a main lobe (the center spot) and side lobes on the both sides of the main lobe. The medium reflects the side lobes as well as the main lobe. The reflected beams of the main lobe and the side lobes interfere with each other to cause an edge shift in the reproduced signal. The edge shift distorts the reproduced signal to increase the jitter in the reproduced signal.

A filter (e.g., a slit or a pin-hole) can be incorporated in the super-resolution optical system to remove the reflected beam of the side lobes. However, the filter cannot remove the reflected beam of the side lobes sufficiently to prevent distortion and jitter in the reproduced signal.

SUMMARY OF THE INVENTION

In view of the aforementioned problems of the conventional optical information recording medium, one object of the present invention is to provide an information recording medium in which the phase-contrast is produced by a principle other than the destructive interference of light waves.

Another object of the present invention is to provide an information recording medium having a sufficient reflective difference between a mirror region and a pit region.

Yet another object of the present invention is to provide an information recording medium which has an increased recording density.

Yet another object of the present invention is to provide an information recording medium in which the jitter of the reproduced signal is reduced.

Yet another object of the present invention is to provide an information recording medium in which the distortion of the reproduced signal is reduced.

Yet another object of the present invention is to provide an information recording medium in which the adverse effect of the side lobe is reduced.

According to the present invention, an information recording medium includes a transparent substrate, an interference layer formed on the transparent substrate, a recording layer formed on the interference layer, a reflective layer formed on the recording layer, and a coating resin formed on the reflective layer. The recording layer has a pit region and a mirror region.

According to the present invention, the mirror region has a reflectivity characteristic different from that of the pit region.

According to the present invention, a reflectivity of the pit portion changes as a thickness of the recording layer changes.

According to the present invention, a reflectivity characteristic of the mirror region is selectively adjustable from that of the pit region within a range of thicknesses of the interference layer.

The interference layer may comprise Si.

The interference layer may include a first interference layer formed on the transparent substrate and a second interference layer formed on the first interference layer.

The first and second interference layers may comprise Si and $Si_3N_4$, respectively.

The first and second interference layers may comprise $TiO_2$ and Si, respectively.

The first and second interference layers may comprise CaF and Si, respectively.

The first and second interference layers may comprise Si and CaF, respectively.

BRIEF DESCRIPTION OF THE DRAWINGS

Other objects, features and advantages of the present invention will become more apparent when the following description is read in conjunction with the accompanying drawings, wherein.

In these drawings, the same reference numerals depict the same parts, respectively.

DETAILED DESCRIPTION OF THE PREFERRED EMBODIMENTS

Next is described a first embodiment of the present invention.

Figure 1:
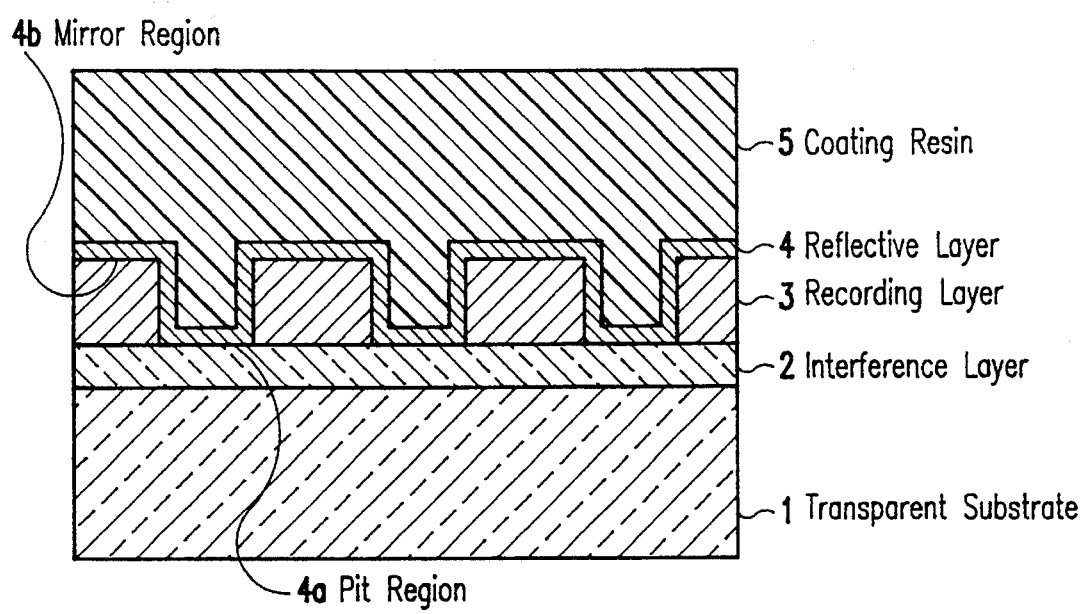
FIG. 1 shows the structure of a medium according to a first embodiment of the present invention.

Referring to FIG. 1, an information recording medium according to the first embodiment comprises a transparent substrate 1, an interference layer 2, a recording layer 3, a reflective layer 4 and a coating resin 5. The laser beam incident is from the transparent substrate 1.

In the first embodiment, the transparent substrate 1 is a glass ($SiO_2$) substrate having a thickness of about 1.2 mm. The transparent layer 1 can be formed from a thermoplastic resin such as polymethylmethacrylate (PMMA), polycarbonate (PC), amorphous polyolefin (APO), and/or epoxy.

The interference layer 2, which serves as an interference filter, is formed on the glass substrate 1. In the first embodiment, the interference layer 2 is an Si film having a thickness of 30 nm. Si is a desirable material for the interference Layer 2 because of the following reasons. First, Si has a relatively high refractive index of 3.5. Second, Si has a relatively low absorptivity of less than 0.1. Third, Si has a sufficient transparency characteristics for allowing the laser beam therethrough. Other materials preferably used as the interference layer 2 are described below.

A recording layer 3 is formed on the interference layer 2. Concave pit portions 4a are formed in the recording layer 3. In the first embodiment, the thickness of the recording layer 3 is about 100 nm. The recording layer 3 is preferably formed from Te alloy, TeTiAgSe, or Te-C (amorphous). The recording layer 3 may be formed from a photo-resist.

A reflection layer 4 is formed on the recording layer 3. In this embodiment, the reflection layer 4 is an Al film having a thickness of about 60 nm. The reflection layer 4 can also be formed from at least one material selected from a group comprising Ag, Au, Cu, In, Ti, V, Nb, Cr, Mo, W, Mn, Fe, Ru, Os, Co, Rh, Ir, Ni, Pd, and Pt. The material of the reflection layer is selected according to the wavelength of the light source. The depth of the reflection layer 4 is placed within the focal depth of the laser beam.

The reflection layer 4 may further include a film of a transparent dielectric or a semiconducting material such as Si and/or Ge. This configuration increases the reflectivity for light having a specific wavelength.

A coating resin 5 (e.g., an ultraviolet light curing resin) is formed on the reflection layer 4. The thickness of the coating region 5 is about 50 μm.

The concave portion of the recording layer 3 forms the pit region 4a. Other planar portions of the recording layer 3 form a mirror region 4b.

Next is described the manufacturing process of the aforementioned information recording medium.

In a first step, the transparent substrate 1 is prepared.

In a second step, the interference layer 2 is sputtered on the transparent substrate 1.

In a third step, the recording layer 3 is formed on the interference layer 2. Thereafter, the pit region 4a is formed by a laser cutting method. The details of the laser cutting method is described in John Watkinson, "The Art of Data Recording", p.478, Focal Press, Oxford, England, 1994.

In the third step, the recording layer 3 is cut sharply because, due to the high heat conductivity thereof, the Si interference layer 3 enhances the diffusion of heat to avoid a "half-tone" of the recording layer 3.

In a fourth step, the reflective layer 4 is sputtered on the recording layer 3.

In a fifth step, the coating resin 5 is applied to the reflective layer 4.

Next is described the result of first and second simulations for showing the functional difference between the medium according to the first embodiment and the conventional medium.

Figure 2:
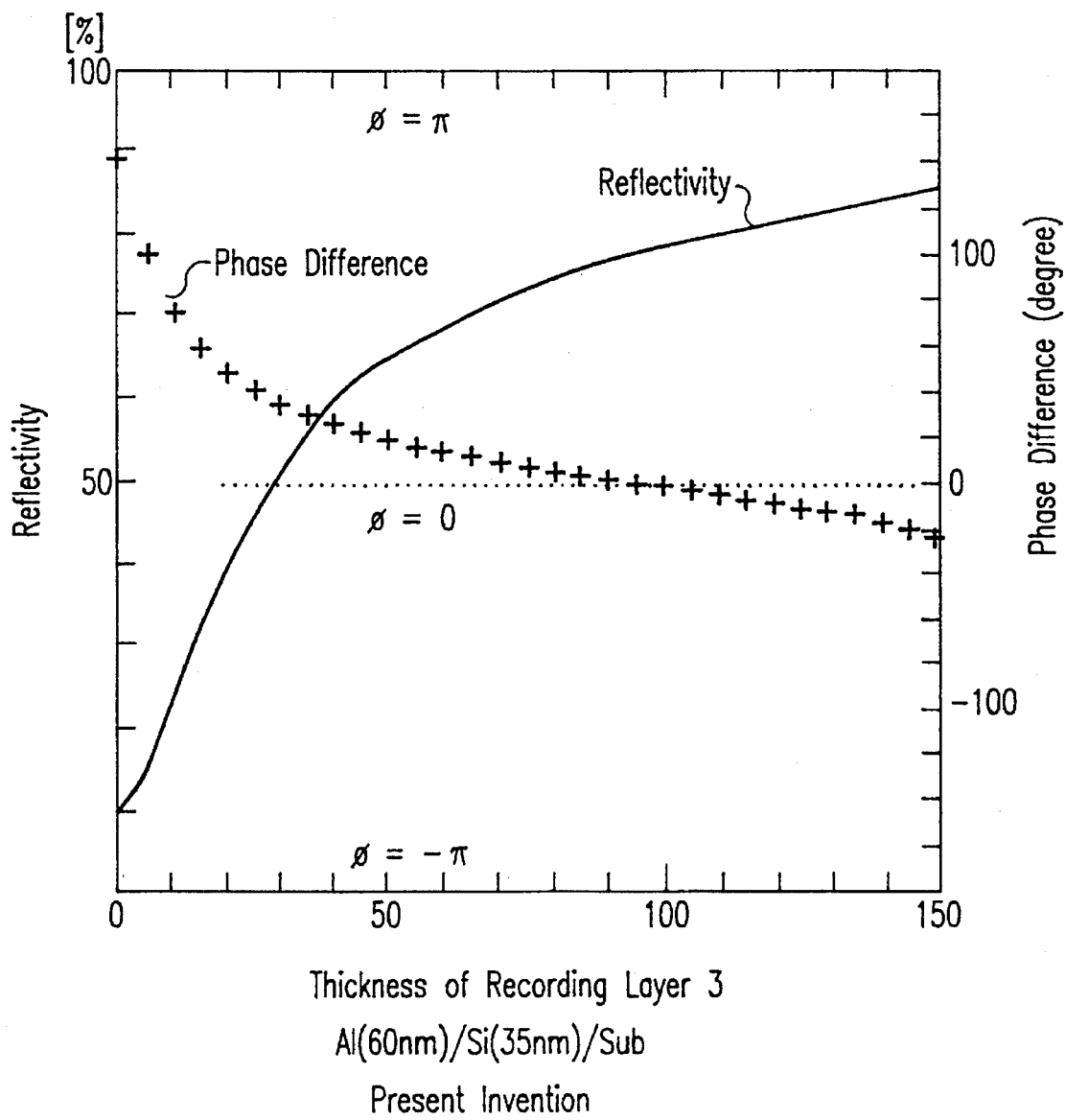
FIG. 2 shows the result of a first simulation for estimating the relationship between the thickness of the recording layer 3, and the reflectivity and the phase difference of the mirror region 4b of the medium according to the first embodiment.

Referring to FIG. 2, the first simulation shows the relationship between the thickness of the recording layer 3 and the reflectivity of the pit portion 4a of the medium according to the first embodiment of the present invention.

In the first simulation, the thickness of the interference layer 2, the recording layer 3 in the mirror portion 4b, and the reflective layer 4 are set to 35 nm, 100 nm, and 60 nm, respectively.

The solid line shows the reflectivity of the pit portion 4a. The marks "+" show the phase difference between the pit portion 4a and the mirror portion 4b, referred to as the reflectivity of the mirror portion 4b ($\phi=0$).

The reflectivity of the pit portion 4a decreases as the thickness of the recording portion 3 decreases. When the thickness of the recording portion 3 is 0, the reflectivity of the pit portion 4a becomes about 10% and is enough to provide a sufficient reflective difference between the pit portion 4a and the mirror portion 4b.

Figure 3:
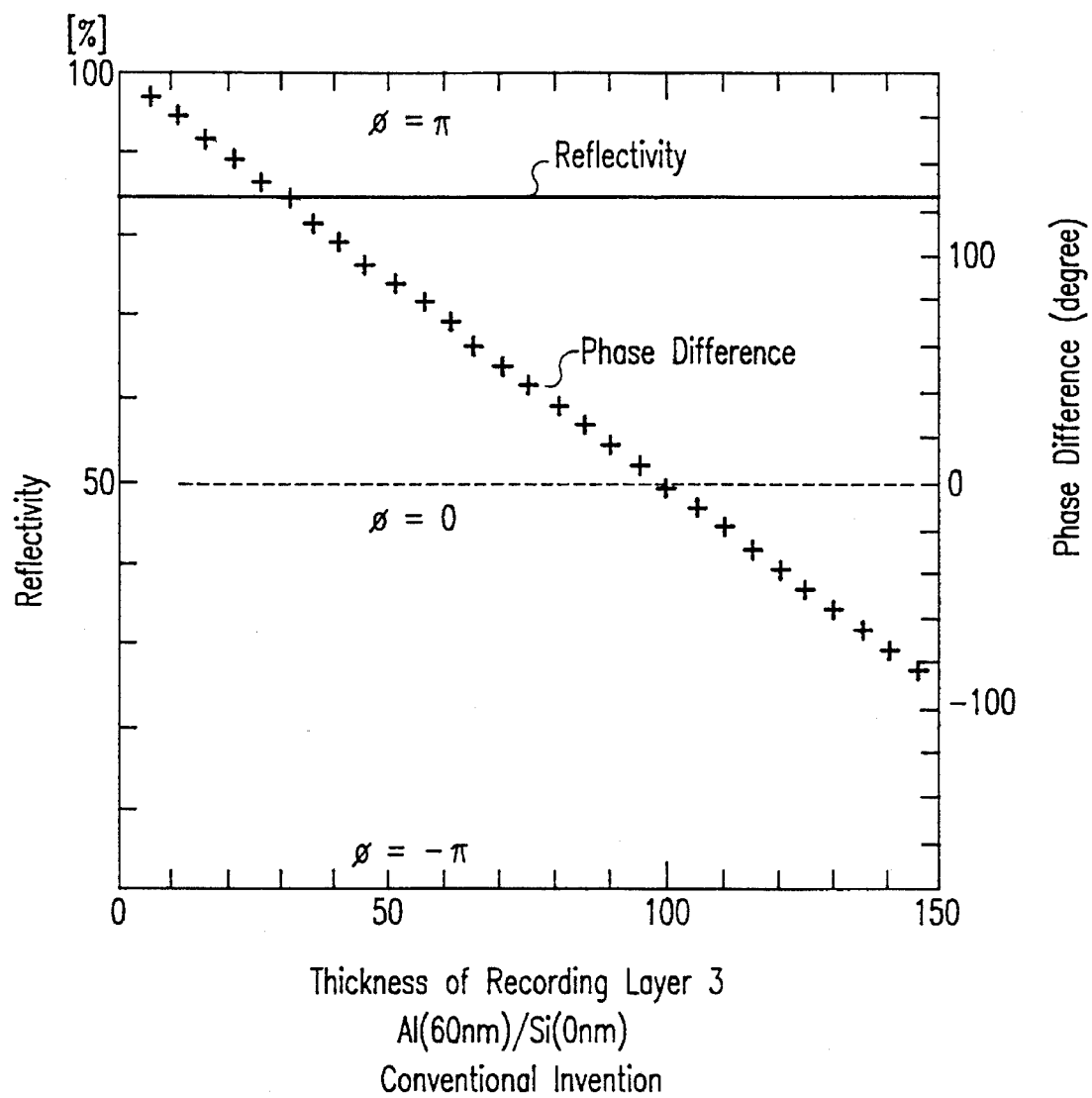
FIG. 3 shows the result of a second simulation for estimating the relationship between the thickness of the recording layer 3, and the reflectivity and the phase difference of the mirror region 4b of the conventional medium.

Referring to FIG. 3, the second simulation shows the relationship between the thickness of the recording layer 3 and the reflectivity of the pit portion 4a of the conventional medium.

In the second simulation, the thickness of the interference layer 2, the recording layer 3 in the mirror portion 4b, and the reflective layer 4 are set to 0 nm, 100 nm, and 60 nm, respectively. This configuration means that this medium does not have the interference layer 3.

The reflectivity of the pit portion 4a is constant irrespective of the thickness of the recording layer 3, which is completely different from the case of medium according to the first embodiment shown in FIG. 2.

Referring to FIGS. 2 and 3, the phase difference is suppressed in the medium according to the first embodiment compared with that of the conventional medium.

Next is described the result of a third simulation. The third simulation shows the relationship between the position on the medium and the reflectivity at that position.

Figure 4:
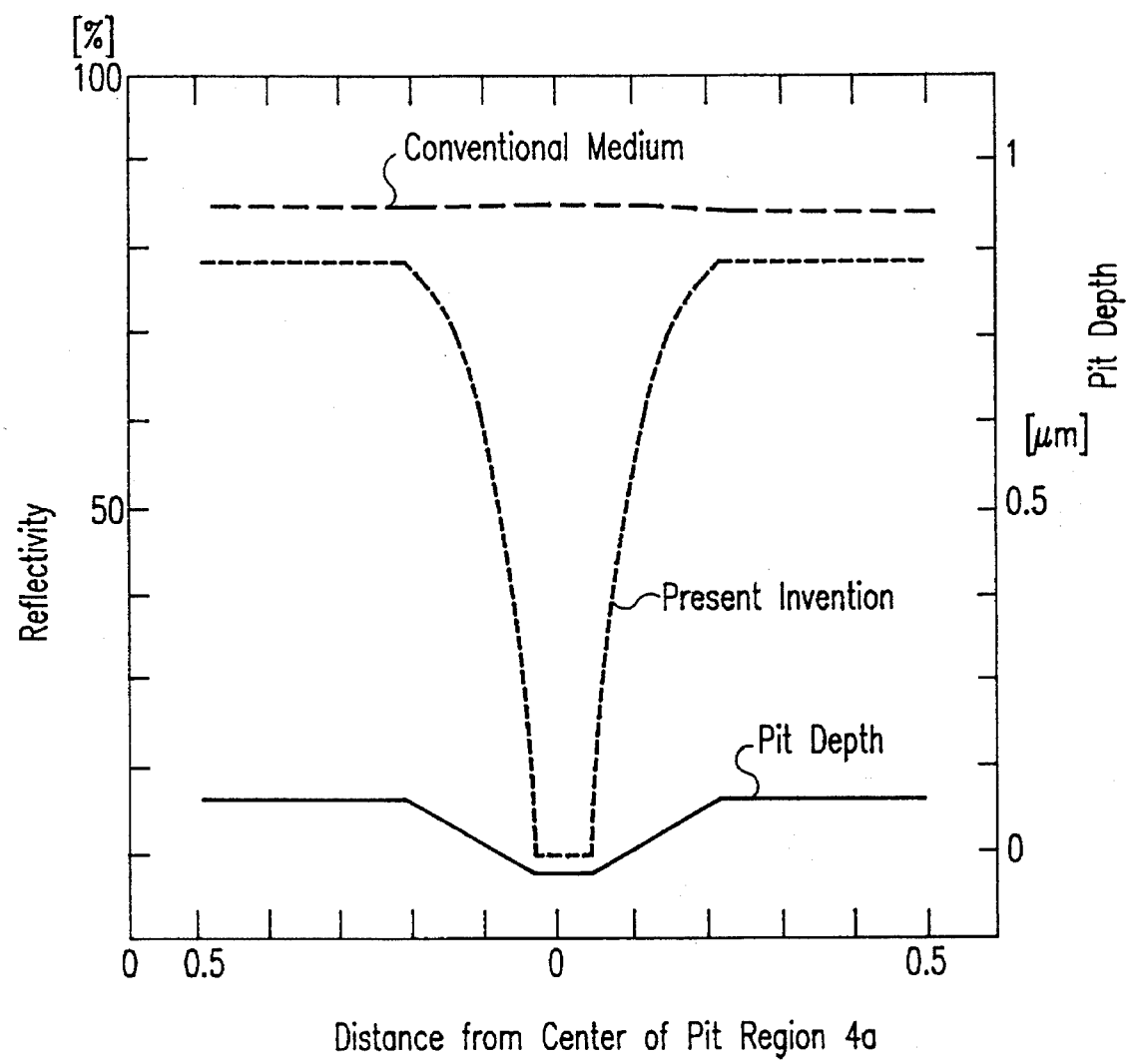
FIG. 4 shows the result of a third simulation for estimating the relationship between the distance from the center of the pit region 4a and the reflectivity at that position.

Referring to FIG. 4, the solid line, the long-dashed line, and the short-dashed line show the depth of the pit portion 4a, the reflectivity of the conventional medium, and the reflectivity of the medium according to the first embodiment. Reflected light on the oblique surface of the pit portion 4a is assumed to be reflected in an incident light direction.

The reflectivity of the conventional medium is a substantially constant value of 84% irrespective of the position on the medium. The reflectivity of the medium according to the first embodiment suddenly decreases in spite of the predetermined gradient of the surface of the pit portion 4a.

Next is described a fourth simulation. The fourth simulation shows the relationship between the position on the medium and the phase difference at that position.

Figure 5:
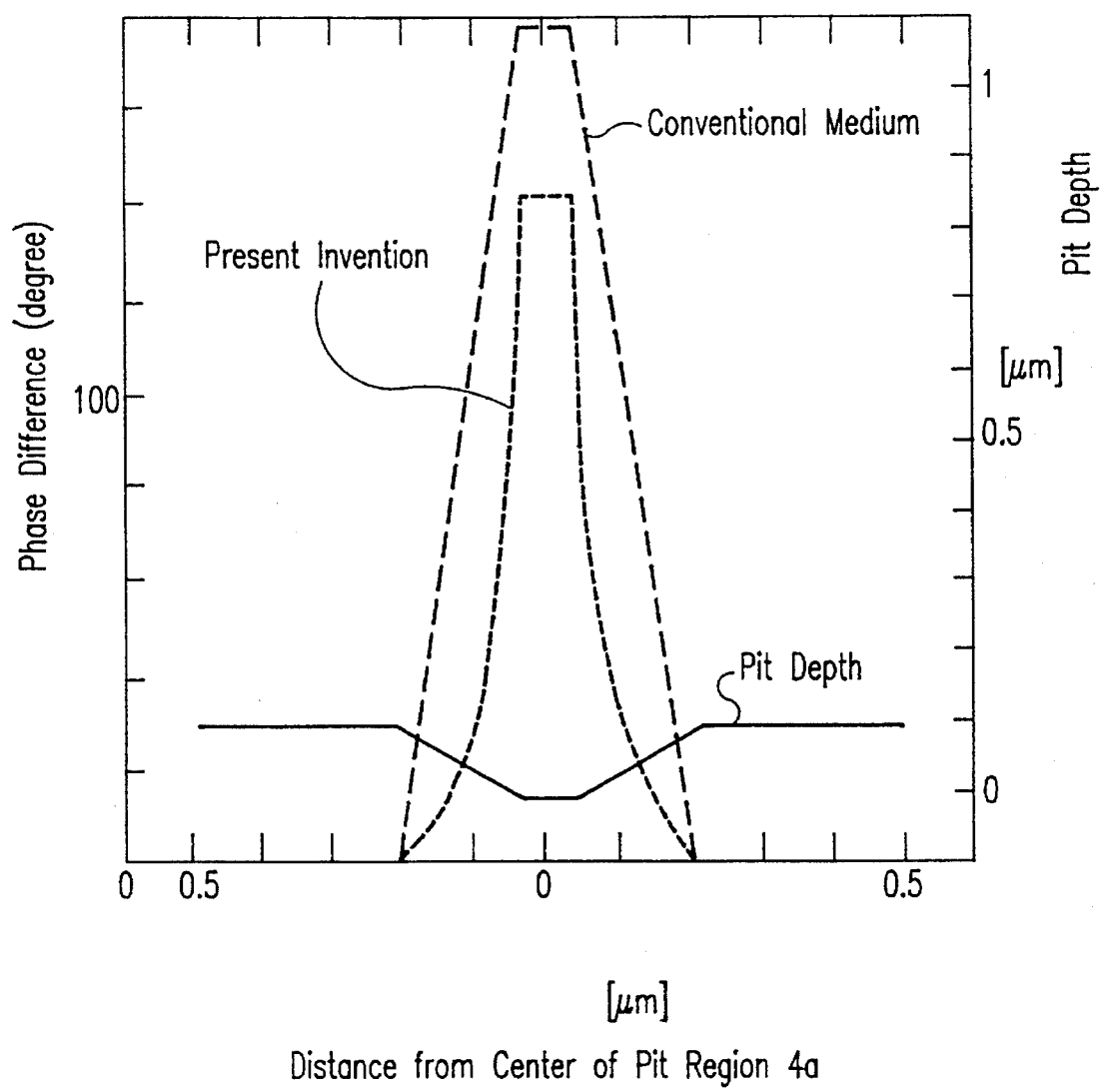
FIG. 5 shows the result of a fourth simulation for estimating the relationship between the distance from the center of the pit region 4a and the phase difference at that position.

Referring to FIG. 5, the solid line, the long-dashed line, and the short-dashed line show the depth of the pit portion 4a the phase difference of the conventional medium, and the phase difference of the medium according to the first embodiment. Reflected light on the oblique surface of the pit portion 4a is assumed to be reflected in an incident light direction.

The medium of the first embodiment has a phase difference less than that of the conventional medium.

Next is described the result of a fifth simulation for determining the preferred thickness of the interference layer 2.

Figure 6:
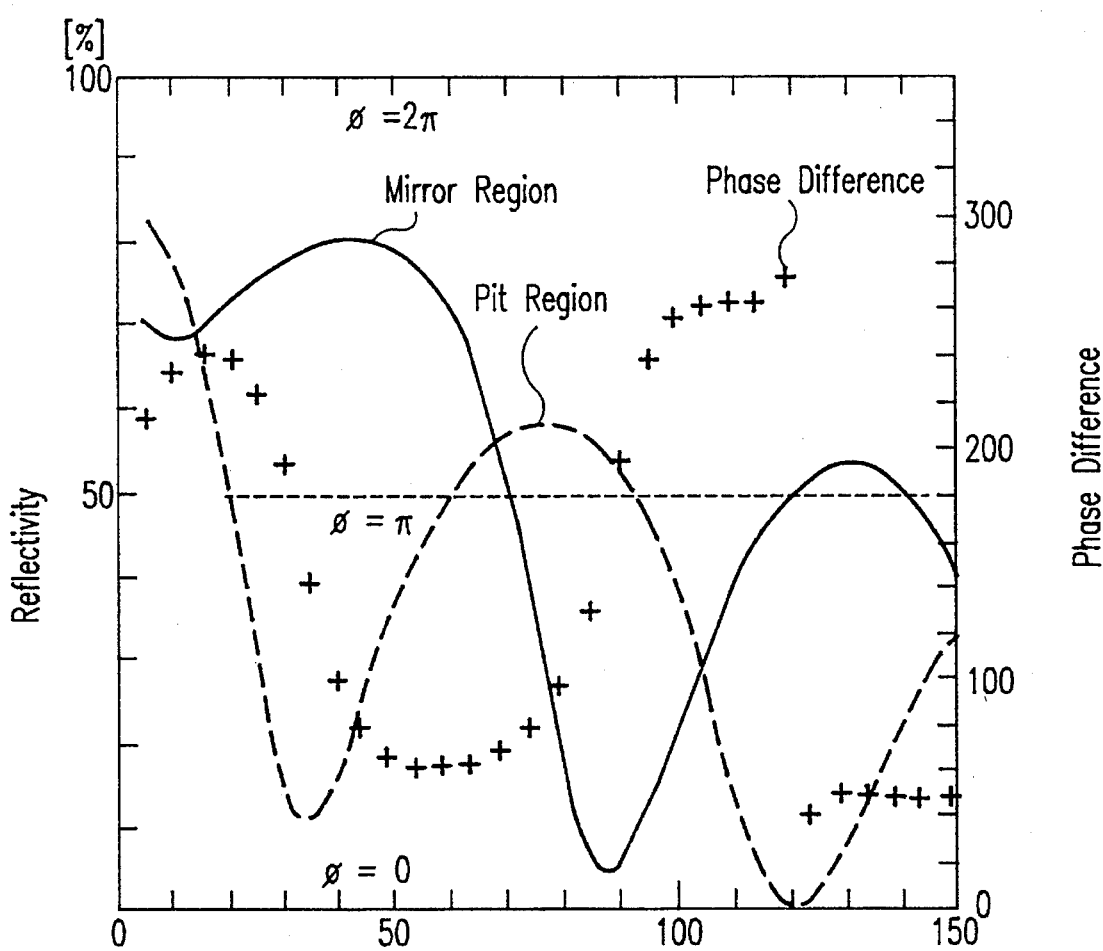
FIG. 6 shows the result of a fifth simulation for determining desired ranges of the thickness of the interference layer 2.

Referring to FIG. 6, the first simulation shows the relationship between reflectivity of the medium and the thickness of the interference layer 2.

The solid and the broken lines show the reflectivity of the mirror portion 4b and that of the pit portion 4a of the medium shown in FIG. 1, respectively. The marks "+" show the phase difference between the pit portion 4a and the mirror portion 4b. In this simulation, the wavelength of the laser beam is set to 680 nm.

When the thickness of the interference layer 2 is within the range of 30 nm to 45 nm or within the range of 125 to 130 nm, a sufficient reflective difference is provided between the mirror portion 4a and the pit portion 4b. When the thickness of the interference layer 2 is within the range of 125 to 130 nm, the reflectivity of the pit portion 4b and the phase difference between the mirror portion 4a and the pit portion 4b are minimized simultaneously.

When the thickness of the interference layer 2 is within the range of 80 nm to 95 nm, the pit portion 4a has a higher reflectivity than that of the mirror portion 4b. In this configuration, the reflectivity of the mirror section 4b is decreased thereby also lowering noise among adjacent pits.

Next is described the evaluation of the medium according to the first embodiment with respect to the reflectivity thereof.

The reflectivities of the mirror portion 4b and the pit portion 4a of the medium having the interference layer 2 of 30 nm were 77.91% and 35.71% of the reflectivity of the medium having no interference layer 2, respectively.

The reflectivities of the mirror portion 4b and the pit portion 4a of the medium having the interference layer 2 of 90 nm were 52.67% and 8.73% of the reflectivity of the medium having no interference layer 2, respectively.

Next is described the evaluation of the medium according to the first embodiment with respect to 3T jitter which indicates the distortion of the reproduction signal.

The evaluation was performed on a medium in which the thickness of the transparent substrate, the interference layer, the recording layer, the reflective layer and the coating resin were 1.2 mm, 110 nm, 90 nm, 60 nm and 0.9 μm, respectively.

Figure 7:
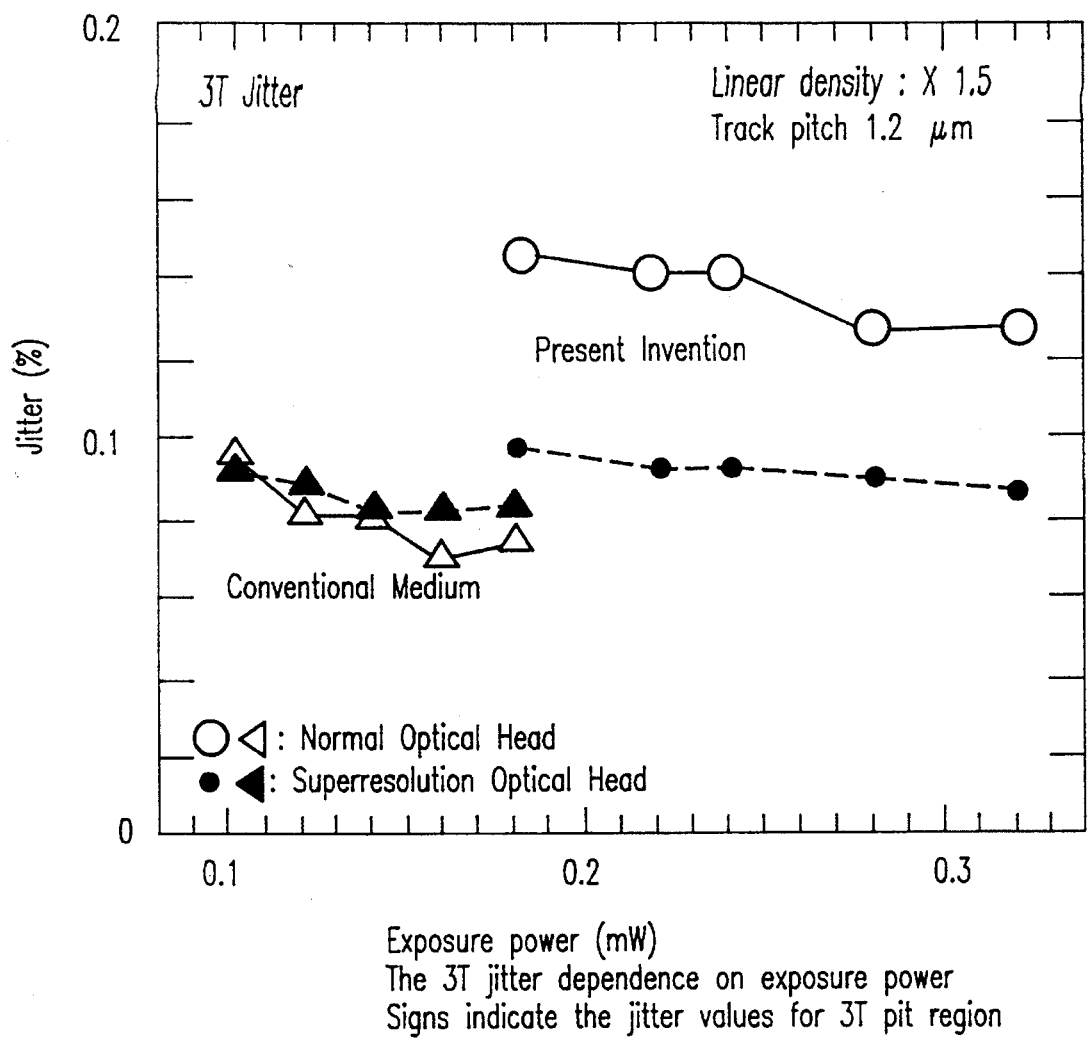
FIG. 7 shows the result of an estimation of the medium according to the first embodiment of the present invention.
Figure 8:
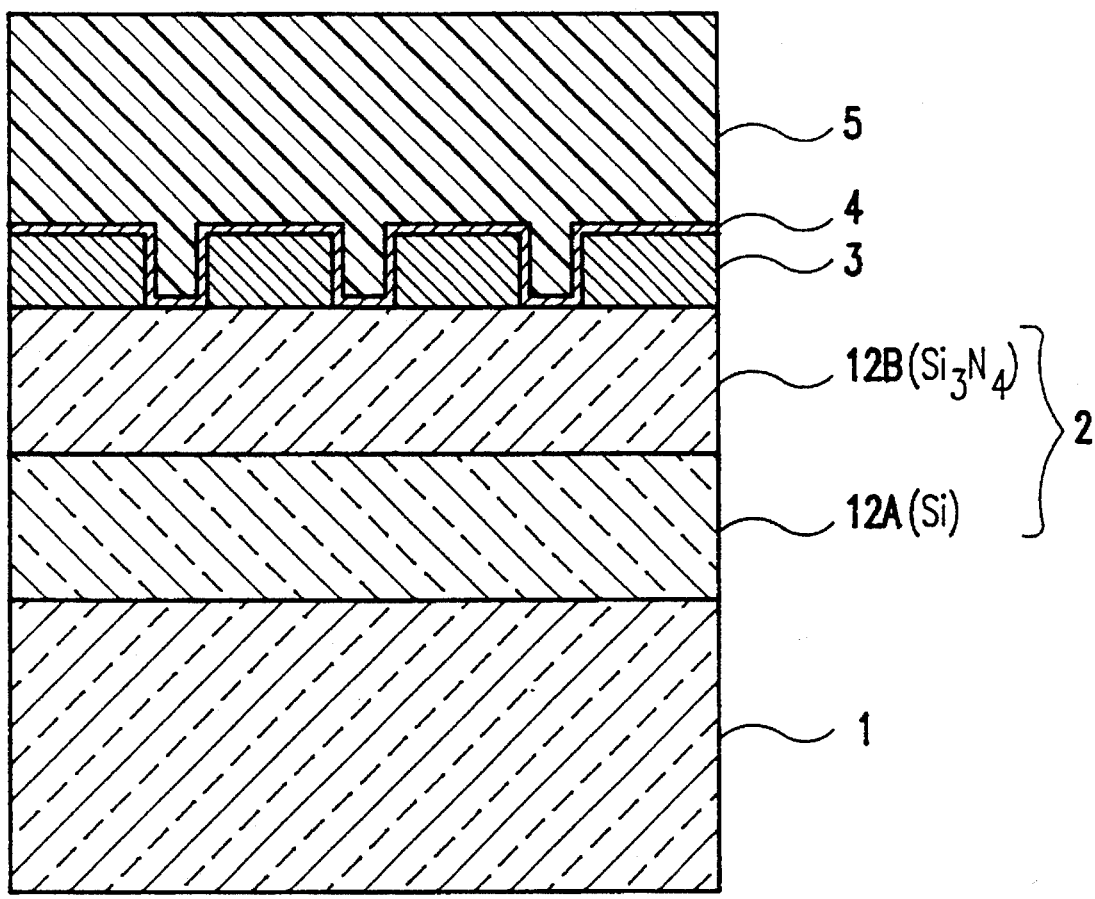
FIG. 8 shows the structure of the medium according to the second embodiment of the present invention.

Referring to FIG. 7, the open and closed triangles indicate the 3T jitter of the conventional medium evaluated by a normal optical system and by the super-resolution optical system, respectively.

The open and closed circles indicate the 3T jitter of the aforementioned medium evaluated by a normal optical system and by the super-resolution optical system, respectively.

In the conventional medium, jitter of the super-resolution optical system was worse than that of normal optical system. On the other hand, in the aforementioned medium according to the present invention, jitter of the super-resolution optical system was much improved as compared to that of the normal optical system.

Next is described the causes of the aforementioned improvement. Presently, it is believed that the following reasons are the basis for the improvement.

First, the effect of the side lobes is reduced because the reflectivity of the pit region 4a, which has a relatively large phase difference, is lower than that of the mirror region 4b as shown in FIG. 4. When the side lobes are reflected from the pit region 4a, the amount of the reflected beam of the side lobes is reduced because of the low reflectivity of the pit region 4a. When the side lobes are reflected from the mirror region 4b, the reflected beam of the side lobes have little effect on the reproduction signals because the phase difference in the mirror region 4b is relatively small.

Second, the effect of the side lobes is reduced because the phase difference between the pit region 4a and the mirror region 4b is reduced as shown in FIGS. 3 and 5.

Next is described the technical advantages of the first embodiment.

First, the distortion (e.g., jitter) in the reproduction signal is reduced. More specifically, the distortion caused by the side lobes of the diffraction patterns is reduced. The reduction of the signal distortion increases the recording density of the medium.

Second, the recording layer 3 is cut sharply because the "half-tone" of the recording layer 3 is avoided due to the high heat conductivity of the interference layer 2.

Next is described a second embodiment of the present invention. The feature of the second embodiment is the structure of the interference layer 2 and the other structures are the same as those of the first embodiment.

Referring to FIG. 5, the interference layer 2 of a medium according to the second embodiment includes Si layer 12A and $Si_3N_4$ layer 12B. The thickness of the layers 12A and 12B are 30 nm and 90 nm, respectively.

The refractive indices of the transparent substrate 1 ($n_0$), the Si layer 12A ($nx_1$), the $Si_3N_4$ layer 12B ($nx_2$), recording layer 13 (ny), and the reflective layer 14 (nz) satisfy the following relationship:

$n_0 < nx_1$, $nz < ny < nx_2 < nx_1$ (in the mirror region 4b)

$n0 < nx_1$, $nz < nx_2 < nx_1$ (in the pit region 4a).

Next is described the result of a simulation for determining the preferable thickness of the Si layer 12A. In this simulation, the thickness of the $Si_3N_4$ layer 12B and the wavelength of the laser beam are 90 nm and 680 nm, respectively.

Figure 9:
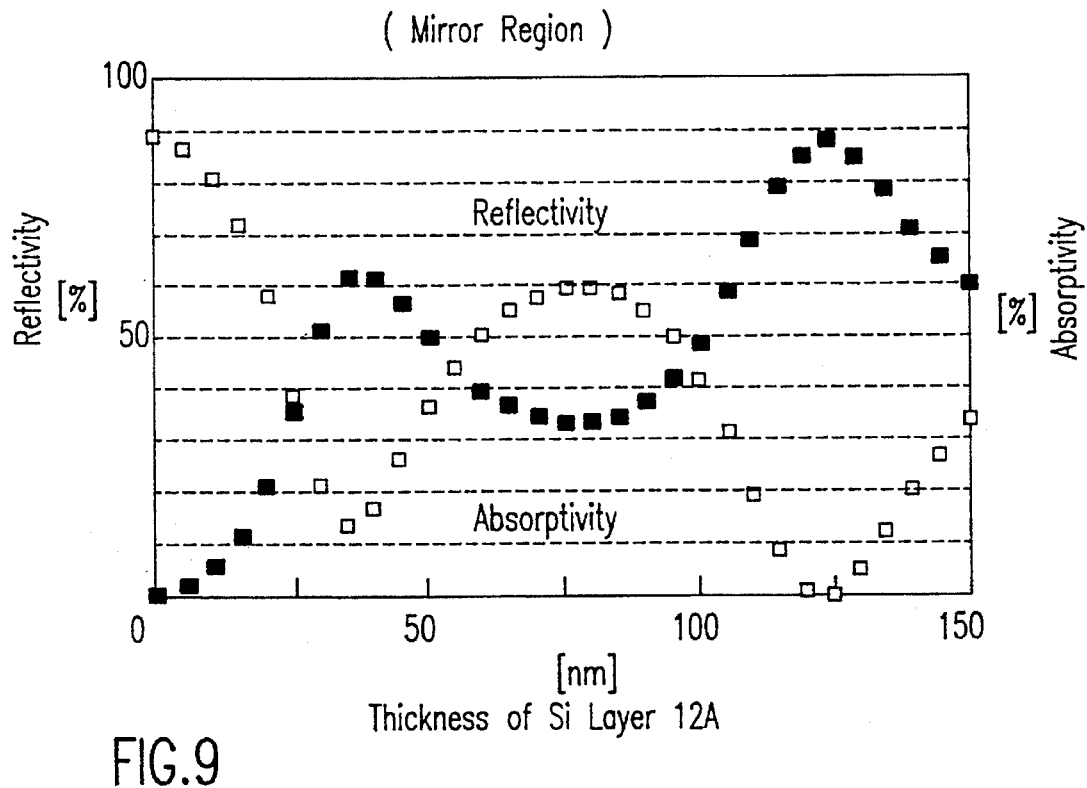
FIG. 9 shows the result of a simulation for estimating the relationship between the thickness of Si layer 12A, and the reflectivity and the absorptivity of the mirror region 4b of the medium according to the second embodiment.

Referring to FIG. 9, the open squares and the closed squares respectively show the reflectivity and the absorptivity of the medium in the mirror region 4b.

Figure 10:
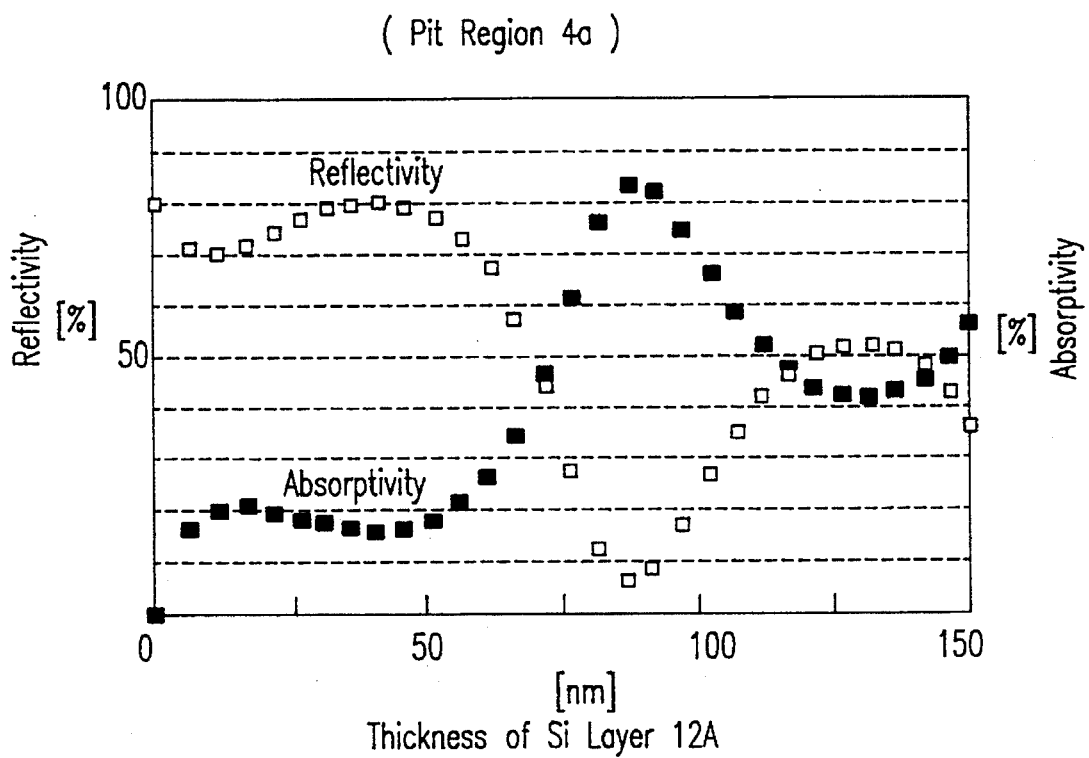
FIG. 10 shows the result of a simulation for estimating the relationship between the thickness of Si layer 12A, and the reflectivity and the absorptivity of the pit region 4a of the medium according to the second embodiment.

Referring to FIG. 10, the open squares and the closed squares respectively show the reflectivity and the absorptivity of the medium in the pit region 4a.

According to FIGS. 9 and 10, when the thickness of the Si layer 12A is within the range of 35 nm to 45 nm or within the range of 115 nm to 135 nm, the reflectivity of the pit region 4a becomes greater than that of the mirror region 4b and is enough to provide a sufficient reflective difference.

Next is described the third embodiment of the present invention. The feature of the third embodiment is the structure of the interference layer 2 and the other structures are the same as those of the first embodiment.

Figure 11:
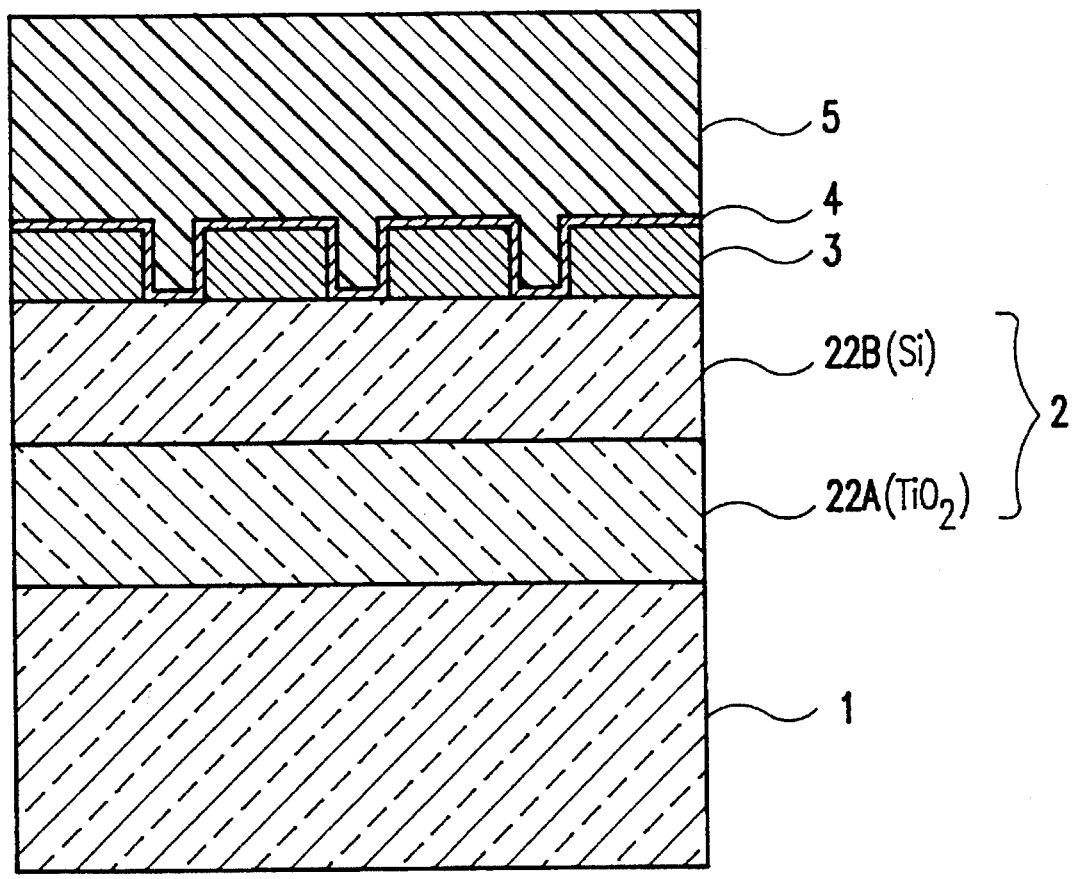
FIG. 11 shows the structure of the medium according to the third embodiment of the present invention.

Referring to FIG. 11 the interference layer 2 of a medium according to the third embodiment includes $TiO_2$ layer 22A and Si layer 22B. The thickness of the layers 22A and 22B are 50 nm and 85 nm, respectively.

The refractive indices of the transparent substrate 1 ($n_0$), the $TiO_2$ layer 22A ($nx_1$), the Si layer 22B ($nx_2$), recording layer 13 (ny), and the reflective layer 14 (nz) satisfy the following relationship:

$n_0 < nx_1 < nx2$, $nz < ny < nx_2$ (in the mirror region 4b)

$n_0 < nx_1 < nx_2$, $nz < nx_2$ (in the pit region 4a).

Next is described the result of a simulation for determining the preferable thickness of the Si layer 22B. In this simulation, the thickness of the $TiO_2$ layer 22A and the wavelength of the laser beam are 50 nm and 680 nm, respectively.

Figure 12:
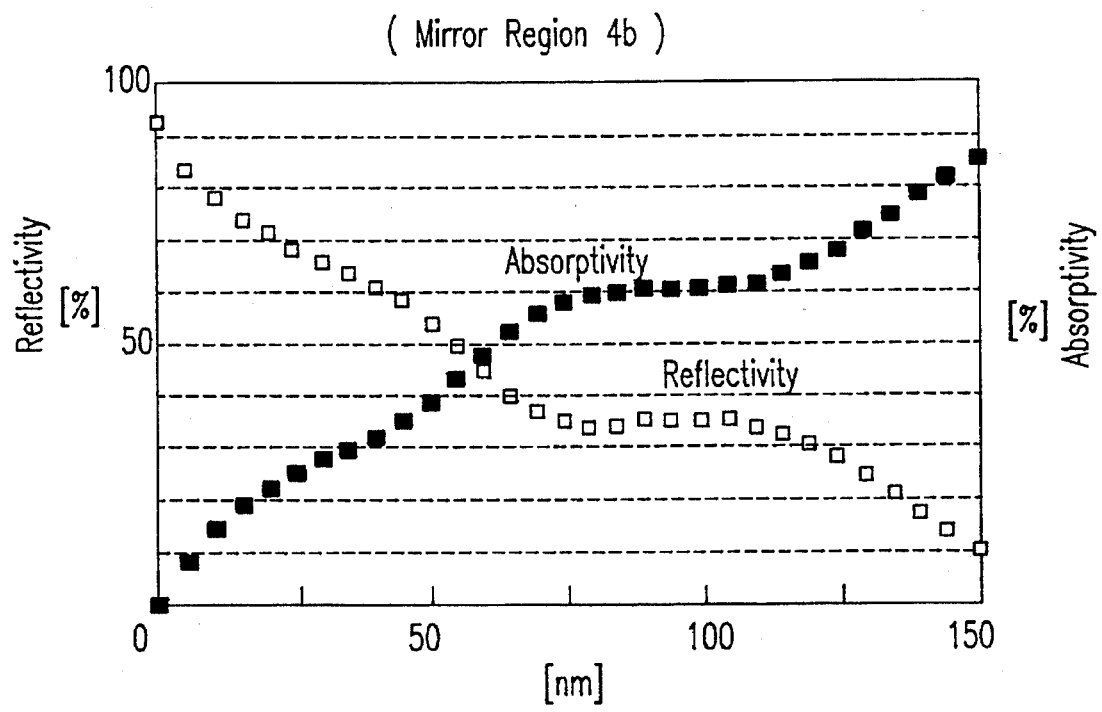
FIG. 12 shows the result of a simulation for estimating the relationship between the thickness of Si layer 22B, and the reflectivity and the absorptivity of the mirror region 4b of the medium according to the third embodiment.

Referring to FIG. 12, the open and closed squares respectively show the reflectivity and the absorptivity of the mirror region 4b.

Figure 13:
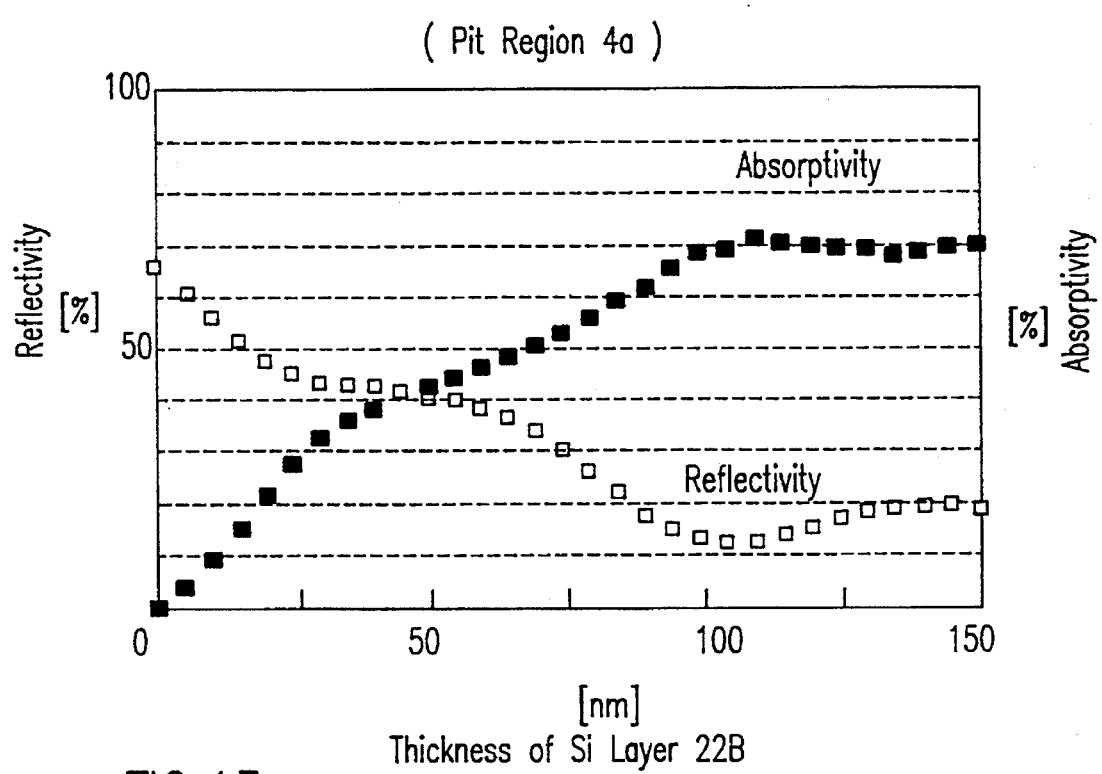
FIG. 13 shows the result of a simulation for estimating the relationship between the thickness of Si layer 22B, and the reflectivity and the absorptivity of the pit region 4a of the medium according to the third embodiment.

Referring to FIG. 13, the open and closed squares respectively show the reflectivity and the absorptivity of the pit region 4a.

According to FIGS. 12 and 13, when the thickness of the Si layer 22B is within the range of 80 nm to 90 nm, the reflectivity of the mirror region 4b becomes sufficiently greater than that of the pit region 4a and the absorptivity of the pit region 4a becomes nearly equal to that of the mirror region 4b.

Next is described the fourth embodiment of the present invention. The feature of the fourth embodiment is the structure of the interference layer 2 and the other structures are the same as those of the first embodiment.

Figure 14:
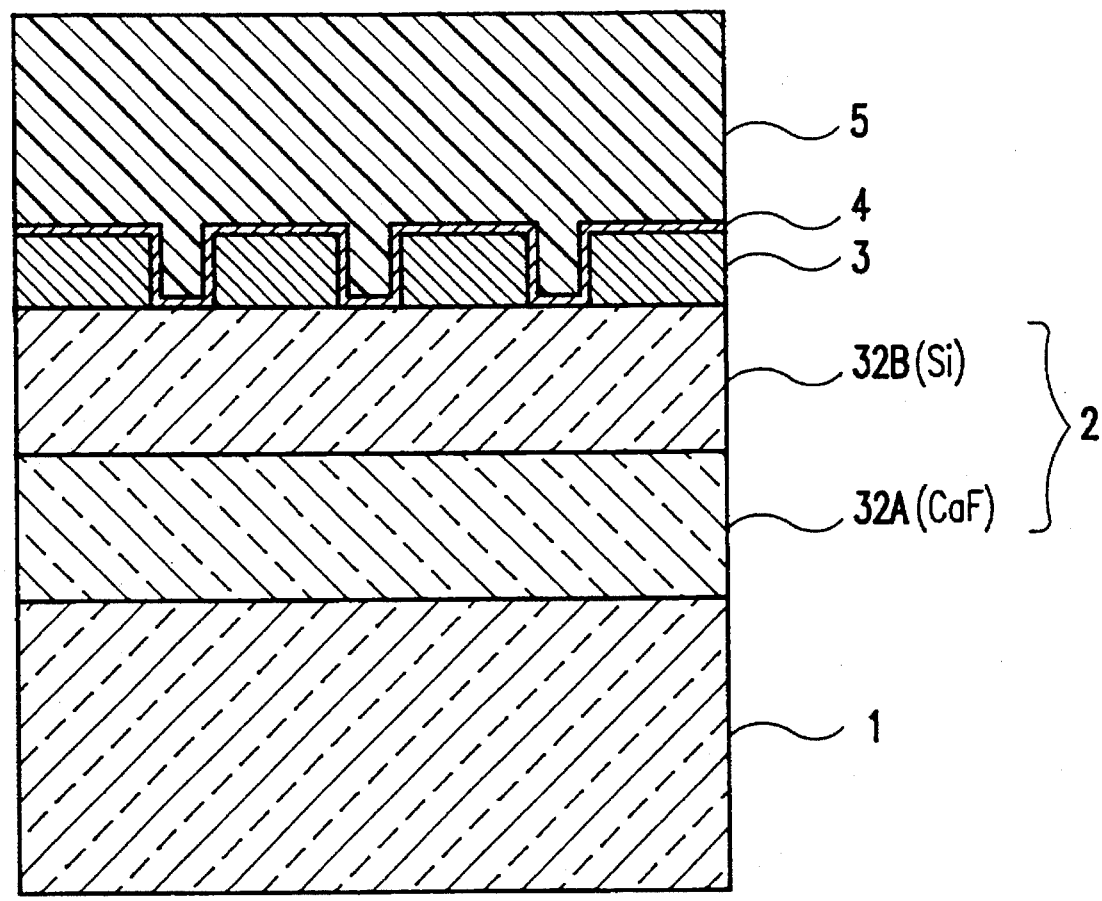
FIG. 14 shows the structure of the medium according to the fourth embodiment of the present invention.

Referring to FIG. 14, the interference layer 2 of a medium according to the fourth embodiment includes CaF layer 32A and Si layer 32B. The thickness of the layers 32A and 32B are 100 nm and 85 nm, respectively.

The refractive indices of the transparent substrate 1 ($n_0$), the CaF layer 32A ($nx_1$), the Si layer 32B ($nx_2$), recording layer 13 (ny), and the reflective layer 14 (nz) satisfy the following relationship:

$nx_1 < n_0$, $nx_1 < n_2$, $nz < ny < nx_2$ (in the mirror region 4b)

$nx_1 < n_0 nx_1 < nx_2$, $nz < nx_2$ (in the pit region 4a).

Next is described the result of a simulation for determining the preferable thickness of the Si layer 32B. In this simulation, the thickness of the CaF layer 32A and the wavelength of the laser beam are 100 nm and 680 nm, respectively.

Figure 15:
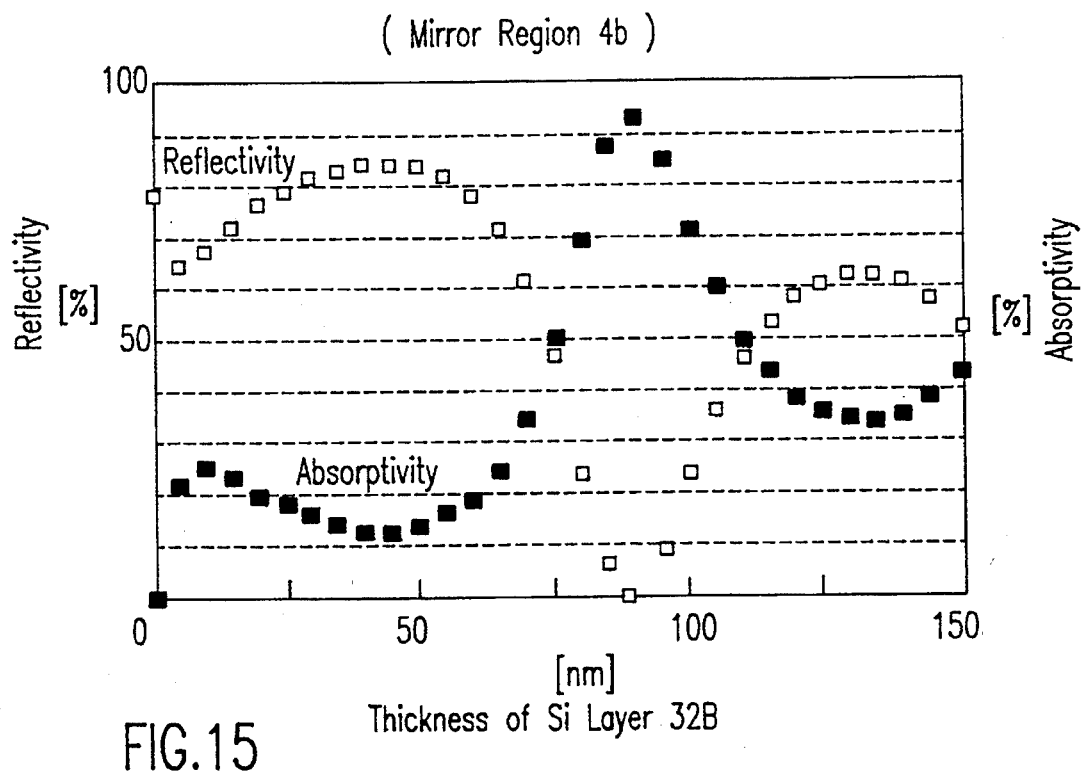
FIG. 15 shows the result of a simulation for estimating the relationship between the thickness of Si layer 32B, and the reflectivity and the absorptivity of the mirror region 4b of the medium according to the fourth embodiment.

Referring to FIG. 15, the open and closed squares respectively show the reflectivity and the absorptivity of the mirror region 4b, respectively.

Figure 16:
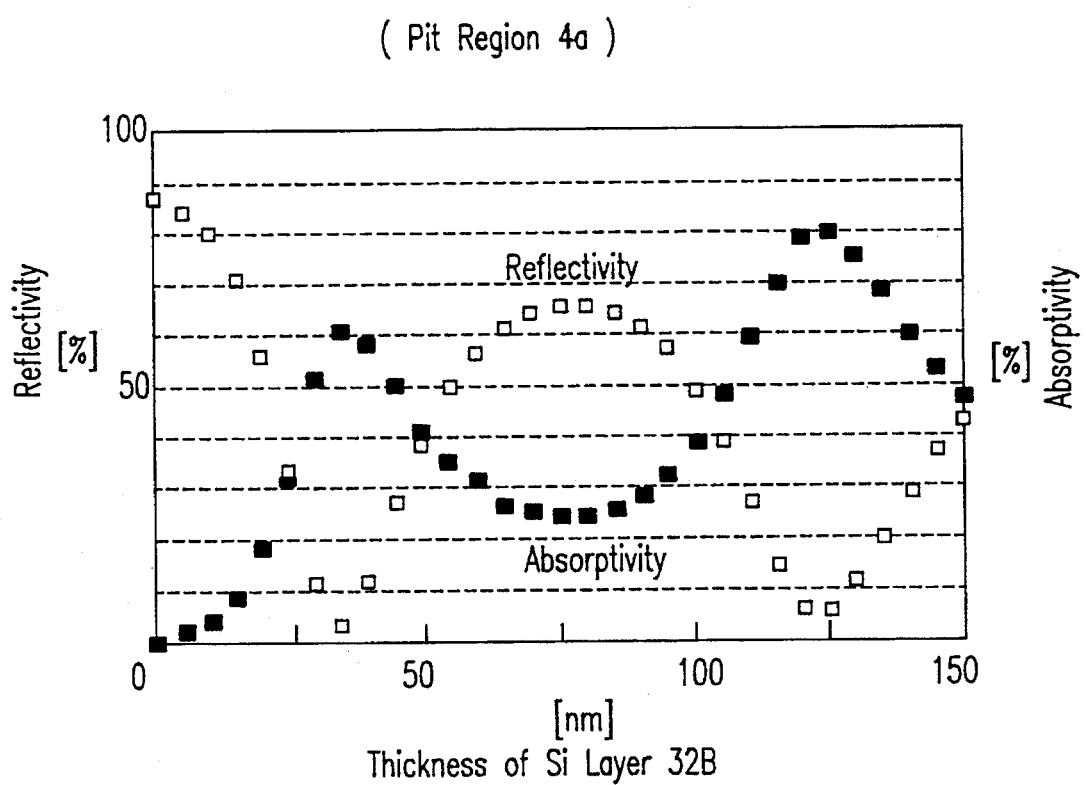
FIG. 16 shows the result of a simulation for estimating the relationship between the thickness of Si layer 32B, and the reflectivity and the absorptivity of the pit region 4a of the medium according to the fourth embodiment.

Referring to FIG. 16, the open and closed squares respectively show the reflectivity and the absorptivity of the pit region 4a, respectively.

According to FIGS. 15 and 16, when the thickness of the Si layer 32B is within the range of 35 nm to 45 nm or within the range of 115 nm to 130 nm, the reflectivity of the mirror region 4b becomes sufficiently greater than that of the pit region 4a and the reflectivity of the pit region 4a becomes less than 10%.

Next is described the fifth embodiment of the present invention. The feature of the fifth embodiment is the structure of the interference layer 2 and the other structures are the same as those of the first embodiment.

Figure 17:
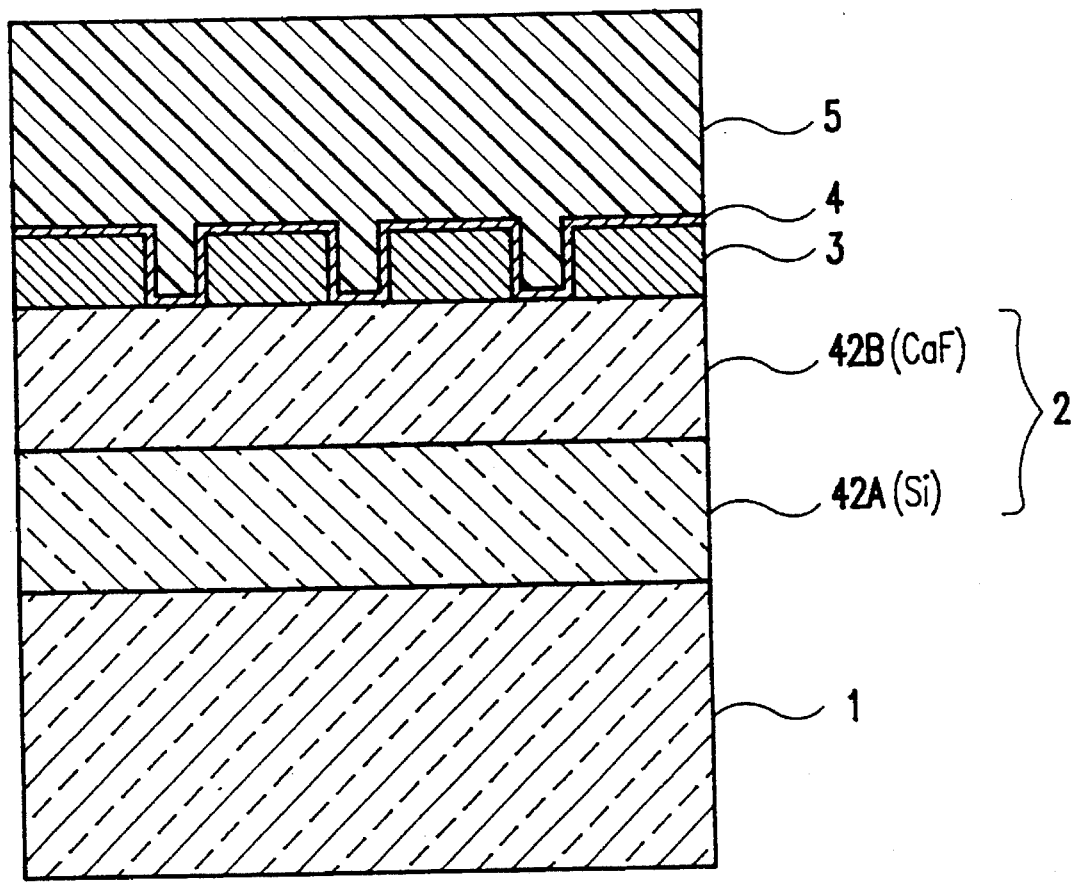
FIG. 17 shows the structure of the medium according to the fifth embodiment of the present invention.

Referring to FIG. 17, the interference layer 2 of a medium according to the fifth embodiment includes Si layer 42A and CaF layer 42B. The thickness of the layers 42A and 42B are 35 nm and 120 nm, respectively.

The refractive indices of the transparent substrate 1 ($n_0$), the Si layer 42A ($nx_1$), the Si layer 42B ($nx_2$), recording layer 13 ($ny$), and the reflective layer 14 ($nz$) satisfy the following relationship:

$$n_0 < nx_1, \; nz < ny < nx_2 < nx_1 \text{ (in the mirror region } 4b)$$

$$n_0 < nx_1, \; nz < nx_2 < nx_1 \text{ (in the pit region } 4a).$$

Next is described the result of a simulation for determining the preferable thickness of the Si layer 42A. In this simulation, the thickness of the CaF layer 42B and the wavelength of the laser beam are 100 nm and 680 nm, respectively.

Figure 18:
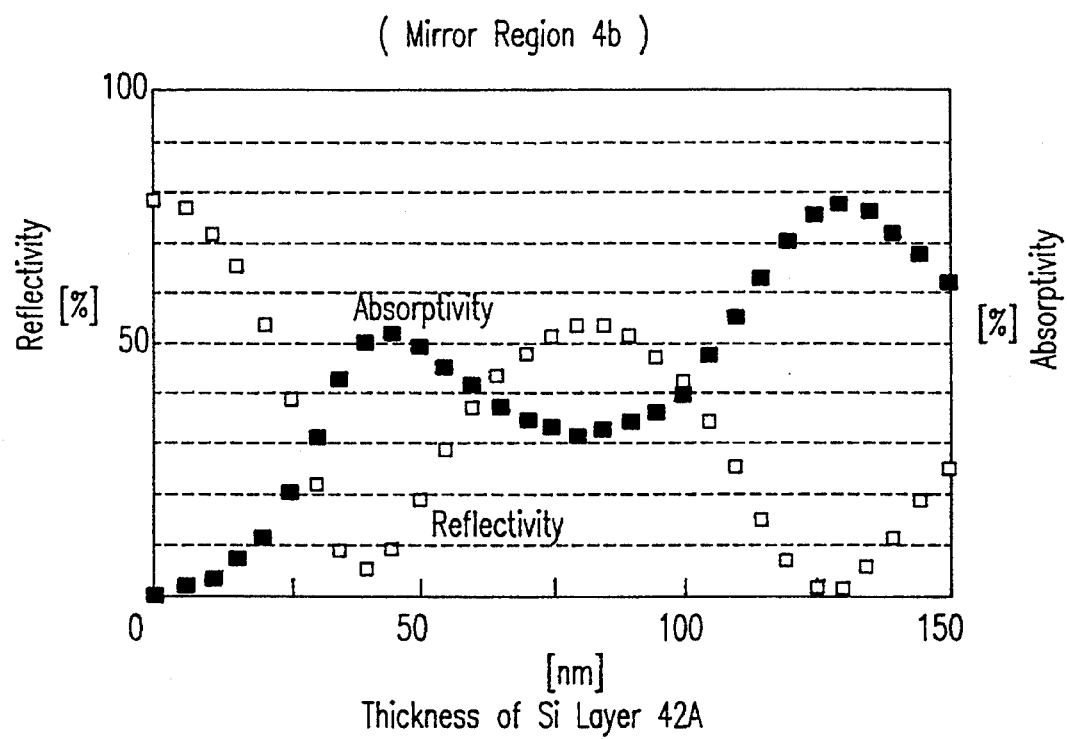
FIG. 18 shows the result of a simulation for estimating the relationship between the thickness of Si layer 42A, and the reflectivity and the absorptivity of the mirror region 4b of the medium according to the fifth embodiment.

Referring to FIG. 18, the open and closed squares respectively show the reflectivity and the absorptivity of the mirror region 4b, respectively.

Figure 19:
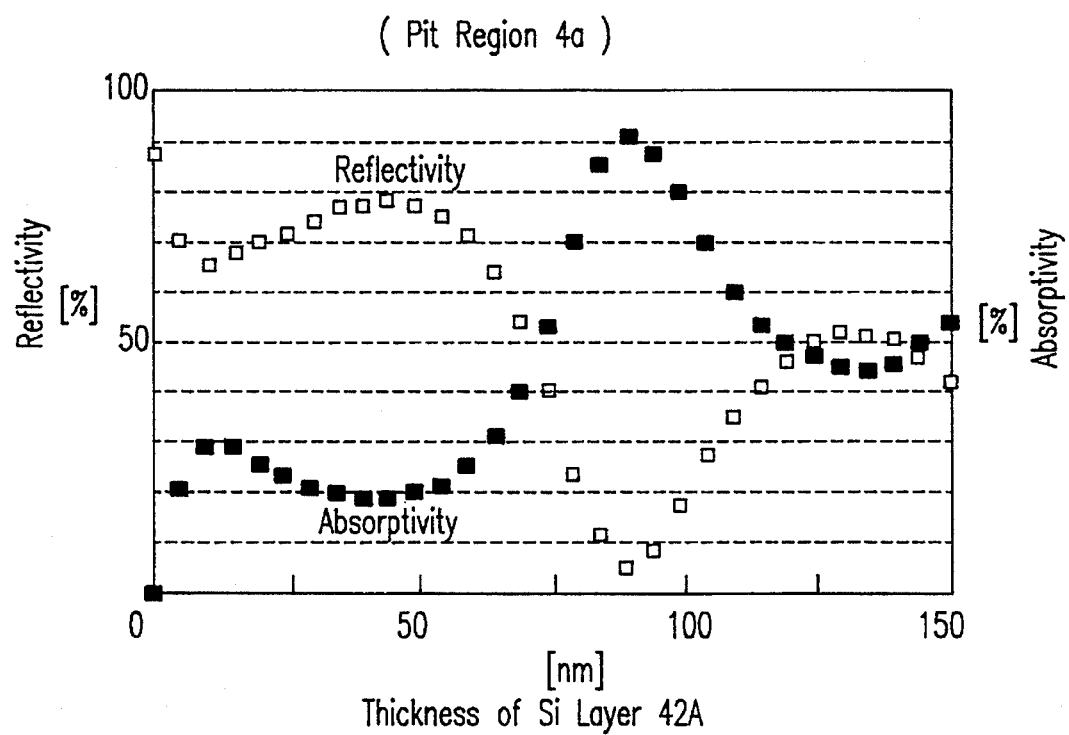
FIG. 19 shows the result of a simulation for estimating the relationship between the thickness of Si layer 42A, and the reflectivity and the absorptivity of the pit region 4a of the medium according to the fifth embodiment.

Referring to FIG. 19, the open and closed squares respectively show the reflectivity and the absorptivity of the pit region 4a, respectively.

According to FIGS. 18 and 19, when the thickness of the Si layer 42A is within the range of 40 nm to 45 nm or within the range of 120 nm to 135 nm, the reflectivity of the pit region 4a becomes sufficiently greater than that of the mirror region 4b and the reflectivity of the mirror region 4b becomes less than 10%.

Next is enumerated the materials preferably used as the interference layer 2. The interference layer 2 may comprise more than one layer formed from the following materials.

Preferably the interference layer 2 has a refractive index less than 1.5. However, materials having a higher refractive index may also be used according to the designer's requirements.

The preferred materials having the refractive index less than 1.5 include LiF (1.39), NaF (1.46), KF (1.32), RbF (1.40), CsF (1.48), CaF (1.32), RbCl (1.48), $MgF_2$ (1.38), $CaF_2$ (1.43), $SrF_2$ (1.44), $BaF_2$ (1.47), $BaMgF_4$ (1.47), $LiYF_4$ (1.45), $Na_2SbF_5$ (1.47), $SiO_2$ (1.46), $RbClO_3$ (1.46), $NH_4ClO_4$ (1.48), $LiClO_4\_3H_2O$ (1.48), $KB_5O_8\_4H_2O$ (1.49), $NH_4B_5O_8\_4H_2O$ (1.42), $BeSO_4\_4H_2O$ (1.47), $Li_2SO_4\_H_2O$ (1.46), $Li_2SeO_4\_H_2O$ (1.46), $LiKSO_4$ (1.46), $LiNaSO_4$ (1.47), $(NH_4CH_3)Al(SO_2)\_12HO$ (1.46), $KNa(C_4H_4O_6)\_4H_2O$ (1.49), and $[CH_2\_CF_2]n$ (1.43). The number in the parentheses following the name of the material is the refractive index of the material.

Among the aforementioned materials, CaF, LiF, NaF, KF, $MgF_2$, and $SiO_2$ are especially desirable.

The preferred materials whose refractive index is within the range of 1.5 to 3.0 include diamond carbon (2.0), $ThF_4$ (1.5), $NdF_3$ (1.61), $CeF_3$ (1.63), $PbF_3$ (1.77), MgO (1.74), ZnO (1.99), BeO (1.72), $Si_2O_3$ (1.55), SiO (2.0), $ThO_2$ (1.86), $TiO_2$ (1.9), $TeO_2$ (2.27), $Al_2O_3$ (1.54), $Y_2O_3$ (1.92), $La_2O_3$ (1.9), $CeO_2$ (2.2), $ZrO_2$ (1.97), $Ta_2O_5$ (2.1), PbO (2.6), $La_2O_2S$ (2.16), $LiGaO_2$ (1.76), $BaTiO_3$ (2.37), $SrTiO_3$ (2.4), $PbTiO_3$ (2.67), $KNbO_3$ (2.33), $K(Ta.Nb)O_3$ (2.29), $LiNbO_3$ (2.30), $LiTaO_3$ (2.175), $Pb(Mg_{1/3} Nb_{2/3})O_3$ (2.56), $Pb(Mg_{1/3} Ta_{2/3})O_3$ (2.40), $Pb(Zn_{1/3} Nb_{2/3})O_3$ (2.54), (Pb, La) $(Zr,Ti)O_2$ (2.51), $PbGeO_3$ (2.02), $Li_2GeO_3$ (1.68), $YAlO_3$ (1.93), $MgAl_2O_4$ (1.73), $BeAl_2O_4$ (1.74), $CoFe_2O_4$ (2.37), $La_2Be_2O_5$ (1.96), (Sr, Ba) $Nb_2O_6$ (2.31), $La_2Ti_2O_7$ (2.25), $Nd_2Ti_2O_7$ (2.15), $Ba_2TiSi_2O_8$, $Ca_2Nb_2O_7$ (1.97), $Ba_2TiSi_2O_8$ (1.762), $Pb_5Ge_3O_{11}$ (2.12), $PbNb_4O_{11}$ (2.41), $Bi_4Ti_3O_{12}$ (2.70), $Bi_4Ge_3O_{12}$ (2.07), $Bi_4Si_3O_{12}$ (2.02), $Y_3Al_5O_{12}$ (1.83), $Y_3Ga_5O_{12}$ (1.93), $Y_3Fe_5O_{12}$ (2.22), $Gd_3Ga_5O_{12}$ (1.96), $(GdFe_5O_{12})$ (2.20), $(Gd,Bi)Fe_5O_{12}$, $Ba_2NaNb_5O_{12}$ (2.20), $Ba_2NaNb_5O_{12}$ (2.26), $Pb_2KNb_5O_{12}$ (2.46), $Sr_2KNb_5O_{15}$ (2.25), $Ba_2LiNb_5O_{15}$ (2.32), $K_3Li_2Nb_5O_{15}$ (2.21), $Ba_3TiNb_4O_{15}$ (2.36), $Bi_{12}GeO_{12}$ (2.55), $Bi_{12}SiO_{20}$ (2.54), $Ca_{12}Al_{14}O_{33}$ (1.61), AgCl (1.98), TlCl (2.19), CuCl (1.99), LiBr (1.78), NaBr (1.64), KBr (1.53), CsBr (1.66), AgBr (2.25), TlBr (2.34), CuBr (2.16), NaI (1.77), KI (1.64), CsI (1.73), AgI (2.18), TlI (2.78), CuI (2.34), Tl(Br, I) (2.20), Tl(CL,Br) (2.40), $PbF_2$ (1.77), $Hg_2Cl_2$ (2.62), $LaF_3$ (1.82), $CsPbCl_3$ (1.94), $BaMgF_4$ (1.47), $BaZnF_4$ (1.51), $Ag_2HgI_4$ (2.4), $NaClO_3$ (1.51), $NaBrO_3$ (1.59), $CdHg(SCN)_4$ (2.04), $ZnSiP_2$ (1.95), ZnS (2.37), ZnSe (2.61), $CdSiP_2$ (2.95), CdS (2.49), CdSe (2.64), CdTe (2.61), HgS (2.89), GaSe (2.98), $LiInS_2$ (2.23), $LiInSe_2$ (2.45), $CuAlS_2$ (2.48), $CuAlSe_2$ (2.64), $CuAlTe_2$ (2.99), $CuInS_2$ (2.53), $CuInSe_2$ (2.70), $CuGaS_2$ (2.49), $CuGaSe_2$ (2.72), $AgAlS_2$ (2.42), $AgAlSe_2$ (2.59), $AgAlTe_2$ (2.90), $AgInS_2$ (2.46), $AgInSe_2$ (2.64), $AgInTe_2$ (2.97), $AgGaS_2$ (2.38), $AgGaSe_2$ (2.61), $AgGaTe_2$ (2.94), $GeS_3$ (2.11), $As_2S_3$ (2.61), $As_2Se_3$ (2.89), $Ag_3AsS_3$ (2.59), $CdGa_2S_{34}$ (2.395), $Tl_3TaS_4$ (2.4), $Tl_3TaSe_4$ (2.71), $Tl_3VS_4$ (2.95), $Tl_3ASS_4$ (2.65), $Tl_3ASSe_4$ (2.93), $Tl_3PSe_4$ (2.93), GaN (1.55), $Si_3N_4$ (2.0), $CaCo_3$ (1.65), $NaNO_3$ (1.60), $Ba(NO_3)_2$ (1.57), $Sr(NO_3)_2$ (1.58), $Pb(NO_3)_2$ (1.78), $NaNO_2$ (1.65), $Sr(NO_2)_2\_H_2O$ (1.56), $LiIO_3$ (1.89), $KIO_3$ (1.70), $NH_4IO_3$ (1.78), $KIO_2F_2$ (1.62), $KIO_3\_HIO_3$ (1.98), $K_2H(IO_3)_2Cl$ (1.88), $LiB_4O_7$ (1.61), $K_2Mn_2(SO_4)_3$ (1.57), $Rb_2Mn_2(SO_4)_3$ (1.60), $Tl_2Mn_2(SO_4)_3$ (1.80), $(NH_4)_2Mn_2(SO_4)_3$ (1.52), $(NH_4)_2Cd_2(SO_4)_3$ (1.57), $LiH_3(SeO_3)_2$ (1.74), $RbH_3(SeO_3)_2$ (1.67), $NH_4H_3(SeO_3)_2$ (1.68), $Sr_2S_2O_6\_4H_2O$, $KH_2PO_4$ (1.53), $KH_2PO_4$ (1.51), $KD_2PO_4$ (1.51), $NH_4H_2PO_4$ (1.52), $ND_4D_2PO_4$ (1.52), $RbH_2PO_4$ (1.51), $KH_2AsO_4$ (1.57), $KD_2AsO_4$ (1.56), $NH_4H_2AsO_4$ (1.58), $Rb_2H_2AsO_4$ (1.58), $RbD_2AsO_4$ (1.57), $CsH_2AsO_4$ (1.57), $CsD_2AsO_4$ (1.55), $KTiOPO_4$ (1.74), $RbTiOPO_4$ (1.75), (K, Rb) (1.75), $Ca_5(PO_4)_3F$ (1.63), $Ca_4La(PO_4)_3O$ (1.70), $LiNdP_4O_{12}$ (1.60), $KNdP_4O_{12}$ (1.56), $NdP_5O_{14}$ (1.59), $CaMoO_4$ (1.99), $PbMoO_4$ (2.41), $CaWO_4$ (1.92), $ZnWO_4$ (2.14), $Gd_2(MoO_4)_3$ (1.843), $Tb_2(MoO_4)_3$ (1.848), $Bi(MoO_4)_3$ (2.28), $K_5$ (Bi,Nd) $(MoO_4)_4$ (1.97), $Pb_2MoO_5$ (2.18), $Bi_2WO_6$ (2.5), $YVO_4$ (2.00), $Ca_3(VO_4)_2$ (1.86), $Pb_5(GeO_4)(VO_4)_2$ (2.28), $Gd_2SiO_5$ (1.9), $Al_2(SiO_4)F$ (1.63), $CaY_4(SiO_4)_3O$ (1.83), $CaLa_4(SiO_4)_3O$ (1.86), $SrLa_4(SiO_4)_3O$ (1.79), (NaCa) Li (A, $FeMn)_8$ (1.65), $Be_3Al_2Si_6O_{18}$ (1.57), $C_{14}H_{10}$ (1.55), $C_{24}H_{18}$ (1.52), $CO(NH_2)_2$ (1.60), $Ba(COOH)_2$ (1.57), $Sr(COOH)_2$ (1.55), $Pb_2Sr(CH_3CH_2COO)_6$ (1.49), $C_4H_6O_6$ (1.49), $(NH_4CH_2COOH)_3H_2SO_4$ (1.56), $C_4H_3N_3O_4$ (1.52), $(CH_2)_6N_4$ (1.59), $(C_6H_5CO)_2$ (1.84), $C_6H_4NO_2NH_2$ (1.76), $C_6H_4(OH)_2$ (1.59) $C_6H_4(NH_4)OH$ (1.67), $C_5H_3NOCH_3NO_2$ (1.71), $C_6H_4(CO_2)_2HCs$ (1.67) $C_6H_4(CO_2)_2HRb$ (1.66), $C_6H_3NO_2CH_3NH_2$ (1.70), $C_6H_3CH_3(NH_2)_2$ (1.62) $C_6H_2(NO_2)_3OH$ (1.68), $KH(CH_8O_4)$ (1.66), $C_{10}H_{14}O$ (1.58), $C_{10}H_{11}N_3O_6$ (1.56), $C_{10}N_{13}O_4$ (1.52), and $C_{14}H_{17}NO_2$ (2.04).

Among the aforementioned materials, $TiO_2$, $Ta_2O_5$, $Si_3N_4$, Zns, $Y_2O_3$, ZnSe, GaSe, $CuInSe_2$ (2.70), $CuGaS_2$ (2.49), $CuGasSe_2$ (2.72), $AgAlS_2$ (2.42), $AgAlSe_2$ (2,59), $AgASlTe_2$ (2.90), $AgInS_2$ (2.46), $AgInSe_2$ (2.64), $AgInTe_2$ (2.97), $AgGaS_2$ (2.38), $AgGaSe_2$ (2.61), $AgGaTe_2$ (2.94), and $GeS_3$ (2.11) are especially desirable.

The preferred materials whose refractive index is at least 3.0 include Ge (4.01), Si (3.082), Se (5.56), Te (4.85), ZnTe (3.05), ZnTe (3.85), HgSe (3.75), PbS (3.5), PbTe (5.6), $In_{57}Se_{43}$ (3.8), $In_3Se_2$ (3.8), InSe (3.8), $In_2Sb_3$ (4.1), GaSb (4.6), $TlGaSe_2$ (3.0), $Ag_3SbAgS_3$ (3.08), $Tl_3AsSe_3$ (3.33), $CuGaTe_2$ (3.01), $CuInTe_2$ (3.05), $ZnSiAs_2$ (3.22), $ZnGeP_2$ (3.14), $ZnGeAs_2$ (3.38), $ZnSnP_2$ (3.21), $ZnSnAs_2$ (3.53), $CdSiAs_2$ (3.22), $CdGeP_2$ (3.20), $CdGeAs_2$ (3.56), $CdSnP_2$ (3.14), $CdSnAs_2$ (3.46), GaAs (3.42), GaSb (3.9), GaP (3.35), InP (3.37), InAs (3.4), InSb (3.75), $Sb_2S_3$ (3.0), $Sb_2Te_3$ (5.0), (Ga,Al)As (3.21~3.65), Ga(As,P) (3.29~3.36), (Ga,Al)Sb (3.2~3.92), (InGa) (ASP) (3.21~3.42), $CdGeAs_2$ (3.69), $Ge_{19}Sb_{38}Te_{43}$ (4.15), $Ge_{18}Se_{32}Te_{50}$ (4.28), $Ge_{27}Se_{18}Te_{55}$ (93.05), $In_{22}Sb_{33}Te_{45}$ (4.295), $In_{22}Sb_{37}Te_{41}$ (4.968), $In_{20}Sb_{37}Te_{43}$ (4.952), $In_{32}Sb_{40}Te_{28}$ (3.045), $Sb_{56}Se_{40}Zn_4$ (4.234), $Sb_{44}Se_{29}Zn_{27}$ (3.492), $Sb_{34}Se_{58}Sn_8$ (5.068), $Se_{52}Ge_{27}Sn_{21}$ (3.761), $Te_{64}Sb_6Sn_{30}$ (3.147), $Se_{66}Sb_{24}Ge_{10}$ (4.240), $Te_{80}Se_{10}Sb_{10}$ (4.0), $GeSb_2Te_4$ (4.7), TeOx (3.8), GeTe (4.4).

Among the aforementioned materials, Ge, Si, and InSe are especially desirable.

Next is described the modifications of the aforementioned embodiments.

The reflectivity (Rm), the absorptivity (Am) and phase ($\phi$m) of the mirror region 4b, and the reflectivity (Rp), the absorptivity (Ap) and phase ($\phi$p) of the pit region (4a) may satisfy the following relationship:

Rp<Rm, Am≦Ap, |cos ($\phi$m–p)|<1.

Rm, Am, $\phi$m, Rp, Ap, and $\phi$p may satisfy the following relationship:

Rm<Rp, Ap≦Am, |cos ($\phi$m–$\phi$p)|<1.

The interference layer 2 may comprise an amorphous Si alloy containing hydrogen and has being capable of light and heat adjustment. Where the average composition of the interference layer 2 in the film thickness direction is represented by $Si_{1-x}H_x$, "x" is set to the range of (28/47) to (28/29) as an atomic percentage. In this case, a refractive index of the interference layer 2 is within the range of 4.0 to 4.5.

The interference layer 2 may be formed of an alloy containing micro-crystallized Si including hydrogen. Where the average composition of the interference layer 2 in a film thickness direction is represented by $Si_{1-x}H_x$, "x" is set to the range of (28/47) to (28/37). In this configuration, the refractive index of the interference layer 2 is within the range of 3.3 to 3.5.

The interference layer 2 may be formed of an amorphous SiC alloy containing hydrogen. Where the average composition of the interference layer 2 in a film thickness direction is represented by $(SiC)_{1-x}H_x$, "x" is set to the range of (40/49) to (40/41). In this configuration, the refractive index of the interference layer 2 is in the range of 3.1 to 4.1.

The interference layer 2 may be formed of an amorphous SiGe alloy containing hydrogen. Where the average composition of the interference layer 2 in a film thickness direction is represented by $(SiGe)_{1-x}H_x$, "x" is set to the range of (503/598) to (503/518). In this configuration, the refractive index of the interference layer 2 is in the range of 3.2 to 3.8.

The interference layer 2 may be formed of amorphous Si nitride. When the average composition of the interference layer 2 in a film thickness direction is represented by $Si_{1-x}N_x$, "x" is set to the range of 0 to (4/7). In this configuration, the refractive index of the interference layer 2 is in the range of 2.0 to 3.82.

The interference layer 2 may be formed of amorphous Si oxide. Where the average composition of the interference layer 2 in a film thickness direction is represented by $Si_{1-x}O_x$, "x" is set to the range of 0 to (2/3). In this configuration, the refractive index of the interference layer 2 is in the range of 1.46 to 3.82.

The interference layer 2 may comprise more than one member of the group of materials including three members. The first member is a material whose refraction index is less than 1.5. The second member is a material whose refractive index is within the range of 1.5 to 3.0. The third member is a material whose refraction index is more than or equal to 3.0.

The interference layer 2 may comprise at least one or more single-elements and at least one kind of chalcogenide compounds.

The interference layer 2 may comprise at least one kind of chalcogenide compound and at least one member of a group comprising antimony, zinc, tin, lead, copper, silver, gold indium, and germanium.

The interference layer 2 may comprise at least one member of a group comprising antimony, zinc, tin, lead, copper, silver, gold or indium, and a binary compound of the selected member of the group and a chalcogenide compound.

The interference layer 2 may comprise a compound formed by the reaction between indium and tellurium, and a compound formed by the reaction between antimony and tellurium.

The interference layer 2 may comprise at least one member of a group comprising oxygen, nitrogen, and fluorine, and at least one kind of chalcogenide compound.

The present embodiments are therefore, to be considered in all respects as illustrative and not restrictive, the scope of the invention being indicated by the appended claims rather than by the foregoing description and all changes which come within the meanings and range of equivalency of the claims are therefore intended to the embraced therein.

What is claimed is:

1. An information recording medium, comprising:

a transparent substrate;

an interference layer formed on said transparent substrate;

a recording layer formed on said interference layer, said recording layer having a pit region and a mirror region;

a reflective layer formed on said recording layer; and a coating resin formed on said reflective layer, wherein said interference layer has a refractive index of at least 3.0.

2. An information recording medium according to claim 1, wherein said interference layer comprises Si.

3. An information recording medium according to claim 1, wherein said recording layer comprises at least one of a Te alloy, TeTiAgSe, and amorphous Te-C.

4. An information recording medium according to claim 1, wherein said reflective layer comprises at least one of Al, Ag, Au, Cu, In, Ti, V, Nb, Cr, Mo, W, Mn, Fe, Ru, Os, Co, Rh, Ir, Ni, Pd, and Pt.

5. An information recording medium according to claim 1, wherein said interference layer includes a first interference layer formed on said transparent substrate and a second interference layer formed on said first interference layer.

6. An information recording medium according to claim 5, wherein said first and second interference layers comprise Si and $Si_3N_4$, respectively.

7. An information recording medium according to claim 5, wherein said first and second interference layers comprise $TiO_2$ and Si, respectively.

8. An information recording medium according to claim 5, wherein said first and second interference layers comprise CaF and Si, respectively.

9. An information recording medium, comprising:
a transparent substrate;
an interference layer formed on said transparent substrate;
a recording layer formed on said interference layer, said recording layer having a pit region and a mirror region;
a reflective layer formed on said recording layer; and
a coating resin formed on said reflective layer, wherein a reflectivity at said mirror region is at least 10% greater than a reflectivity at said pit region.

10. An information recording medium, comprising:
a transparent substrate;
an interference layer formed on said transparent substrate;
a recording layer formed on said interference layer, said recording layer having a pit region and a mirror region;
a reflective layer formed on said recording layer; and
a coating resin formed on said reflective layer, wherein a reflectivity at said pit region is at least 10% greater than a reflectivity at said mirror region.

11. An information recording medium, comprising:
a transparent substrate;
an interference layer formed on said transparent substrate;
a recording layer formed on said interference layer, said recording layer having a pit region and a mirror region;
a reflective layer formed on said recording layer; and
a coating resin formed on said reflective layer, wherein said interference layer includes a first interference layer formed on said transparent substrate and a second interference layer formed on said first interference layer, wherein refractive indices of said transparent substrate ($n_0$), said first interference layer ($nx_1$), said second interference layer ($nx_2$), said recording layer ($ny$), and said reflective layer ($nz$) satisfy:

$n_0 < nx_1$, $nz < ny < nx_2 < nx_1$ (in said mirror region); and
$n_0 < nx_1$, $nz < nx_2 < nx_1$ (in said pit region).

12. An information recording medium, comprising:
a transparent substrate;
an interference layer formed on said transparent substrate;
a recording layer formed on said interference layer, said recording layer having a pit region and a mirror region;
a reflective layer formed on said recording layer; and
a coating resin formed on said reflective layer, wherein said interference layer includes a first interference layer formed on said transparent substrate and a second interference layer formed on said first interference layer, wherein refractive indices of said transparent substrate ($n_0$), said first interference layer ($nx_1$), said second interference layer ($nx_2$), said recording layer ($ny$), and said reflective layer ($nz$) satisfy:

$n_0 < nx_1 < nx2$, $nz < ny < nx_2$ (in said mirror region); and
$n_0 < nx_1 < nx_2$, $nz < nx_2$ (in said pit region).

13. An information recording medium, comprising:
a transparent substrate;
an interference layer formed on said transparent substrate;
a recording layer formed on said interference layer, said recording layer having a pit region and a mirror region;
a reflective layer formed on said recording layer; and
a coating resin formed on said reflective layer, wherein said interference layer includes a first interference layer formed on said transparent substrate and a second interference layer formed on said first interference layer, wherein refractive indices of said transparent substrate ($n_0$), said first interference layer ($nx_1$), said second interference layer ($nx_2$), said recording layer ($ny$), and said reflective layer ($nz$) satisfy:

$nx_1 < n_0$, $nx_1 < nx_2$, $nz < ny < nx_2$ (in said mirror region); and
$nx_1 < n_0$, $nx_1 < nx_2$, $nz < nx_2$ (in said pit region).

14. An information recording medium, comprising:
a transparent substrate;
an interference layer formed on said transparent substrate;
a recording layer formed on said interference layer, said recording layer having a pit region and a mirror region;
a reflective layer formed on said recording layer; and
a coating resin formed on said reflective layer, wherein said interference layer includes a first interference layer formed on said transparent substrate and a second interference layer formed on said first interference layer, wherein said first and second interference layers comprise Si and CaF, respectively.

15. An information recording medium, comprising:
a transparent substrate;
an interference layer formed on said transparent substrate;
a recording layer formed on said interference layer, said recording layer having a pit region and a mirror region;
a reflective layer formed on said recording layer; and
a coating resin formed on said reflective layer, wherein said interference layer includes a first interference layer formed on said transparent substrate and a second interference layer formed on said first interference layer, wherein refractive indices of said transparent substrate ($n_0$), said first interference layer ($nx_1$), said second interference layer ($nx_2$), said recording layer ($ny$), and said reflective layer ($nz$) satisfy:

$n_0 < nx_1$, $nz < ny < nx_2 < nx_1$ (in said mirror region); and
$n_0 < nx_1$, $nz < nx_2 < nx_1$ (in said pit region).

16. An information recording medium, comprising:
a transparent substrate;
an interference layer formed on said transparent substrate;
a recording layer formed on said interference layer, said recording layer having a pit region and a mirror region;
a reflective layer formed on said recording layer; and
a coating resin formed on said reflective layer, wherein the reflectivity ($Rm$), the absorptivity ($Am$) and phase ($\phi m$) of the mirror region, and the reflectivity ($Rp$), the absorptivity ($Ap$) and phase ($\phi p$) of the pit region satisfy:

$$Rp < Rm,\ Am \leq Ap,\ |\cos(\phi m - \phi p)| < 1.$$

17. An information recording medium, comprising:
a transparent substrate;
an interference layer formed on said transparent substrate;
a recording layer formed on said interference layer, said recording layer having a pit region and a mirror region;
a reflective layer formed on said recording layer; and
a coating resin formed on said reflective layer, wherein the reflectivity ($Rm$), the absorptivity ($Am$) and phase ($\phi m$)

of the mirror region, and the reflectivity (Rp), the absorptivity (Ap) and phase ($\phi$p) of the pit region satisfy:

$Rm < Rp$, $Ap \leq Am$, $|\cos(\phi m - \phi p)| < 1$.

18. An information recording medium, comprising:

a transparent substrate;

an interference layer formed on said transparent substrate;

a recording layer formed on said interference layer, said recording layer having a pit region and a mirror region;

a reflective layer formed on said recording layer; and a coating resin formed on said reflective layer, wherein said mirror region has a reflectivity characteristic different from that of said pit region.

19. An information recording medium, comprising:

a transparent substrate;

an interference layer formed on said transparent substrate;

a recording layer formed on said interference layer, said recording layer having a pit region and a mirror region;

a reflective layer formed on said recording layer; and a coating resin formed on said reflective layer, wherein a reflectivity of said pit region changes as a thickness of said recording layer changes.

20. An information recording medium, comprising:

a transparent substrate;

an interference layer formed on said transparent substrate;

a recording layer formed on said interference layer, said recording layer having a pit region and a mirror region;

a reflective layer formed on said recording layer; and a coating resin formed on said reflective layer, wherein a reflectivity characteristic of said mirror region is selectively adjustable from that of said pit region within a range of thicknesses of said interference layer.

21. A method for manufacturing an information recording medium, comprising steps of:

(a) preparing a transparent substrate;

(b) forming an interference layer having a refractive index of at least 3.0 on said transparent substrate;

(c) forming a recording layer on said interference layer;

(d) forming a pit region in said recording layer;

(e) forming a reflective layer on said recording layer; and (f) providing a coating resin on said reflective layer.

22. An information recording medium produced by a process comprising steps of:

(a) preparing a transparent substrate;

(b) forming an interference layer having a refractive index of at least 3.0 on said transparent substrate;

(c) forming a recording layer on said interference layer;

(d) forming a pit region in said recording layer;

(e) forming a reflective layer on said recording layer; and (f) providing a coating resin on said reflective layer.

* * * * *